United States Patent [19]
Arbeiter

[11] Patent Number: 5,799,541
[45] Date of Patent: Sep. 1, 1998

[54] TWIST-GRIP SHIFTER FOR BICYCLES AND A BICYCLE HAVING A TWIST-GRIP SHIFTER

[75] Inventor: Markus Arbeiter, Würzburg, Germany

[73] Assignee: Fichtel & Sachs AG, Schweinfurt, Germany

[21] Appl. No.: 610,657

[22] Filed: Mar. 4, 1996

Related U.S. Application Data

[60] Provisional application No. 60/004,006 Sep. 20, 1995.

[63] Continuation-in-part of Ser. No. 566,284, Dec. 1, 1995, Pat. No. 5,666,859, and a continuation-in-part of Ser. No. 563,996, Nov. 29, 1995, Pat. No. 5,588,925.

[30] Foreign Application Priority Data

| Dec. 2, 1994 | [DE] | Germany | 44 42 953.3 |
| Dec. 2, 1994 | [DE] | Germany | 44 42 952.5 |

[51] Int. Cl.⁶ ............................................. B62M 25/04
[52] U.S. Cl. .............................. 74/489; 74/502.2; 74/527
[58] Field of Search .......................... 74/475, 489, 502.2, 74/527

[56] References Cited

U.S. PATENT DOCUMENTS

| D. 269,850 | 7/1983 | Preisler et al. . |
| D. 298,309 | 11/1988 | Coue . |
| D. 299,333 | 1/1989 | Coue . |
| D. 324,634 | 3/1992 | Chen . |
| D. 351,776 | 10/1994 | Schuchard et al. . |
| 2,862,401 | 12/1958 | Gwin . |
| 3,218,879 | 11/1965 | Reed . |
| 4,232,565 | 11/1980 | Leonheart . |
| 4,686,865 | 8/1987 | Rivera . |
| 4,900,291 | 2/1990 | Patterson . |
| 4,938,733 | 7/1990 | Patterson . |
| 4,945,785 | 8/1990 | Romano . |
| 5,102,372 | 4/1992 | Patterson et al. . |
| 5,134,897 | 8/1992 | Romano . |
| 5,197,927 | 3/1993 | Patterson et al. . |
| 5,241,877 | 9/1993 | Chen . |
| 5,315,891 | 5/1994 | Tagawa . |
| 5,390,565 | 2/1995 | Tagawa et al. . |
| 5,421,219 | 6/1995 | Tagawa et al. . |

FOREIGN PATENT DOCUMENTS

| 0671315 | 9/1995 | European Pat. Off. . |
| 2540818 | 8/1984 | France . |
| 2657062 | 7/1991 | France . |
| 2817627 | 11/1978 | Germany . |
| 3215426 | 10/1983 | Germany . |
| 3215427 | 10/1983 | Germany . |
| 8504060 | 12/1985 | Germany . |
| 3823741 | 1/1989 | Germany . |
| 3727933 | 3/1989 | Germany . |
| 9412207 | 2/1995 | Germany . |
| 29502403 | 6/1995 | Germany . |
| 0180484 | 8/1962 | Sweden . |
| 9318960 | 9/1993 | WIPO . |
| 9318961 | 9/1993 | WIPO . |
| 9319977 | 10/1993 | WIPO . |

*Primary Examiner*—Charles A. Marmor
*Assistant Examiner*—Troy Grabow
*Attorney, Agent, or Firm*—Nils H. Ljungman and Associates

[57] ABSTRACT

A twist-grip shifter for bicycles having a twist grip or grip part which is actuated by the rider's hand to change the gears of the bicycle, and a cable winding mechanism or coil wind-up mechanism. The twist grip and the cable winding mechanism of the twist-grip shifter are connected to one another, and debris and other contaminants can be prevented from entering the interior of the twist-grip shifter near this connection by providing a contactless seal or a friction seal. The contactless seal includes a projecting collar on the cable winding mechanism which extends into a groove formed in the twist grip. The collar of the cable winding mechanism essentially does not contact the groove of the twist grip. The friction seal includes a lip or flange formed from the rubber material of the twist grip, which lip then contacts a portion of the collar of the cable winding mechanism.

4 Claims, 12 Drawing Sheets

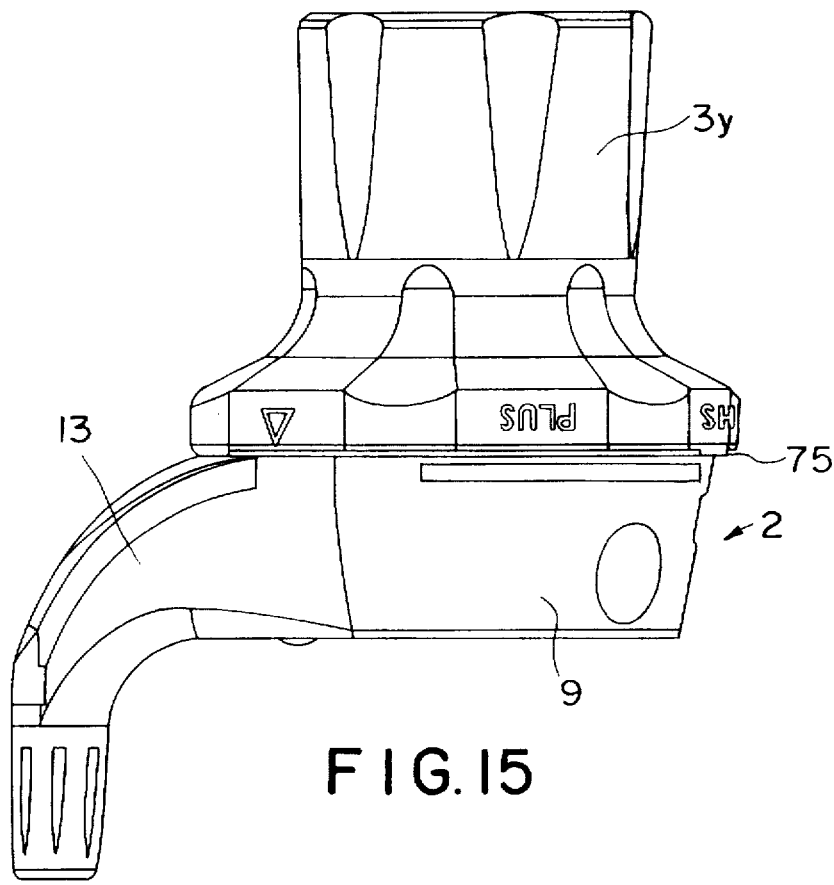
FIG. 15
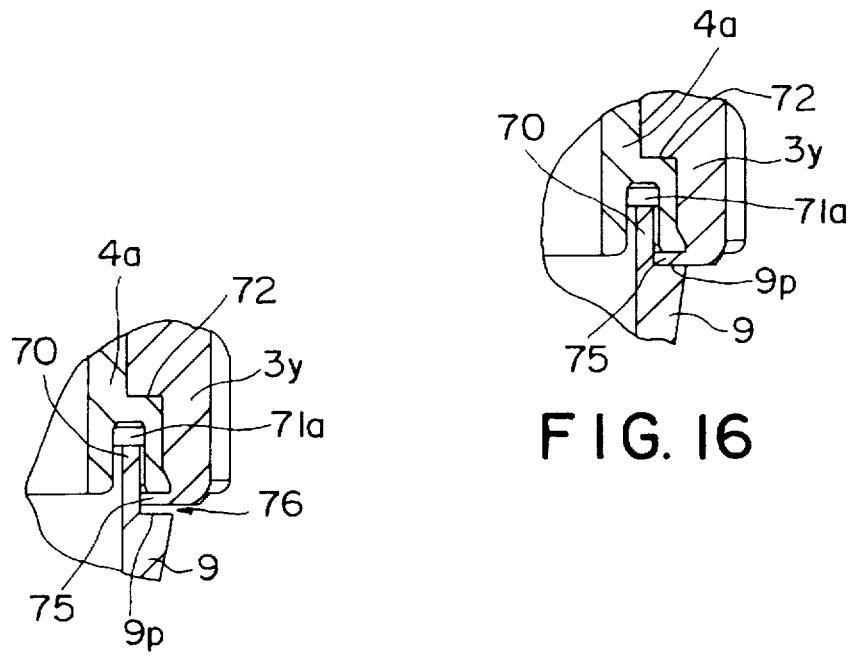
FIG. 16A
FIG. 16

TWIST-GRIP SHIFTER FOR BICYCLES AND A BICYCLE HAVING A TWIST-GRIP SHIFTER

CROSS-REFERENCE TO RELATED APPLICATIONS

The present application is a continuation-in-part of copending U.S. patent application Ser. No. 08/563,996, filed on Nov. 29, 1995 by Markus Arbeiter and Christian Weishaupt, which issued as U.S. Pat. No. 5,588,925 on Dec. 31, 1996, entitled "Shifter for Transmissions on Bicycles" and copending U.S. patent application Ser. No. 08/566,284, filed on Dec. 1, 1995 by Markus Arbeiter, which issued as U.S. Pat. No. 5,666,859 on Sep. 16, 1997, entitled "Latching Shifter for a Bicycle Transmission."

This is a provisional application of Ser. No. 60/004,006 Sep. 20, 1995.

BACKGROUND OF THE INVENTION

1. Field of the Invention

The present invention generally relates to a twist-grip shifter for bicycles, which twist-grip shifter can include a twist grip which is actuated by the rider's hand to change the gears of the bicycle, and a cable winding mechanism or winding drum. Particularly, the present invention relates to the seal between the twist grip and the cable winding mechanism of the twist-grip shifter.

2. Background Information

A twist-grip shifter can typically be located on the handlebar of a bicycle. The type of twist-grip shifter to which the present invention relates is utilized by the rider to change gears of the transmission of the bicycle, in order to adjust for varying riding surface conditions, such as the grade and evenness of the riding surface. The twist-grip shifter can be disposed adjacent the part of the handlebar which the rider typically grips, such as a hand grip, so that the rider can, by movement of the index finger and thumb, shift the gears of the bicycle transmission without a major movement of the hand and/or arm, which movement could result in loss of control of the bicycle.

Since dirt and other contaminants can collect inside of the twist-grip shifter, a seal between the parts of the twist-grip shifter is highly desirable, in order to prevent the contaminants from entering the interior of the twist-grip shifter.

OBJECT OF THE INVENTION

An object of the present invention is to create a simple and economical seal between the parts of a twist-grip shifter, in order to prevent contaminants from entering the interior of the twist-grip shifter.

SUMMARY OF THE INVENTION

A twist grip shifter in accordance with the present invention is typically located immediately adjacent a fixed hand grip on a handlebar of a bicycle. The fixed hand grip is typically located near the end of the handlebar, but can be located at other places along the handlebar depending on the particular curvature of the handlebar in question. The fixed hand grip is typically gripped by the rider's hand in order to steer and therefore control the movement of the bicycle, and the fixed hand grip and the twist-grip shifter can be connected to one another.

The twist-grip shifter in accordance with the present invention can basically be comprised of two parts, the twist grip, the outer part of which the rider can rotate to shift the gears of the bicycle, and a cable winding mechanism. The twist grip and the cable winding mechanism of the twist-grip shifter are rigidly connected to one another, so that the twisting force applied by the rider can be transmitted to the cable winding mechanism. Thus, the rider shifts gears by gripping the outer grip part of the twist grip located adjacent the fixed hand grip, and rotating the outer grip part until the desired gear setting is achieved. Since dirt and other debris can tend to collect inside the twist-grip shifter, a seal between the cable winding mechanism and the twist grip is therefore necessary. Thus, there is a need for a reliable and economical seal between the cable winding mechanism and the twist grip of the twist-grip shifter.

The present invention teaches that the above object can be achieved by providing a collar or flange on the cable winding mechanism, and by providing a groove in the end portion of the twist grip, into which groove the collar of the cable winding mechanism can extend. This type of seal can, in accordance with one embodiment, be a contactless seal which does not typically entail any friction between the collar of the cable winding mechanism and the walls of the groove in the twist grip. For most applications, this type of contactless or frictionless seal is sufficient for preventing dirt and debris from entering the interior of the twist-grip shifter.

In accordance with another embodiment of the present invention, in particular where the twist-grip shifter is to be used for cross-country bicycles or competition bicycles, another type of seal may be desired, since these types of bicycles are generally used in environments with large amounts of dirt, dust, etc. In this case, it may be desirable to use what can be considered to be a friction seal or a lip seal. This type of seal involves contact between the collar or flange of the cable winding mechanism and the twist grip. In accordance with one embodiment, the outer grip part of the twist grip can be made of a molded rubber and/or elastic material, and this outer grip part can be molded onto an inner part of the twist grip. The inner part of the twist grip then engages with a portion of the cable winding mechanism to connect the twist grip and the cable winding mechanism to one another. The rubber outer grip part of the twist grip can preferably be molded to have a sealing lip, which sealing lip can extend around, and make contact with, the collar of the cable winding mechanism in the manner of a lip seal, in order to prevent debris from entering the interior of the twist-grip shifter.

One aspect of the invention resides broadly in a bicycle, the bicycle comprising: a frame; at least two wheels, the at least two wheels comprising at least a front wheel and a rear wheel; the at least two wheels being disposed on the frame; apparatus for propelling at least one of the front wheel and the rear wheel; the apparatus for propelling comprising: a chain; at least two sprockets to engage the chain; at least two pedals, the at least two pedals being connected to one of the at least two sprockets; a seat, the seat being disposed on the frame; a handlebar for steering the bicycle; a bicycle gearing system, the bicycle gearing system comprising: apparatus for shifting gearing associated with the rear wheel of the bicycle; shift actuator apparatus rotatably mounted on the handlebar, generally coaxially with the handlebar; at least one control cable having a first end and a second end; the first end of the at least one control cable being operatively associated with the shift actuator apparatus; the second end of the at least one control cable being operatively associated with the apparatus for shifting gearing; the shift actuator apparatus comprising: an interior portion and an exterior portion; a first part for being rotated in a first direction and a second direction; the first part being operatively connected to the apparatus for shifting gearing; the first part comprising a rotatable grip part; a second part, the second part comprising apparatus for actuating the first end of the at least one control cable; apparatus for connecting the first part and the second part to one another, and for rotating the first part and the second part along with one another; a housing, at least a portion of the second part being disposed within the housing; apparatus for sealing the interior portion of the shift actuator apparatus, the apparatus for sealing being disposed between the housing and the first part.

Another aspect of the invention resides broadly in a handlebar mountable bicycle gear shifter, the gear shifter comprising: shift actuator apparatus rotatably mounted on a handlebar, generally coaxially with the handlebar; at least one control cable having a first end and a second end; the first end of the at least one control cable being operatively associated with the shift actuator apparatus; the second end of the at least one control cable for being operatively associated with gearing; the shift actuator apparatus comprising: an interior portion and an exterior portion; a first part for being rotated in a first direction and a second direction; the first part being operatively connected to the gearing; the first part comprising a rotatable grip part; a second part, the second part comprising apparatus for actuating the first end of the at least one control cable; apparatus for connecting the first part and the second part to one another, and for rotating the first part and the second part along with one another; a housing, at least a portion of the second part being disposed within the housing; apparatus for sealing the interior portion of the shift actuator apparatus, the apparatus for sealing being disposed between the housing and the first part.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is described in greater detail below with reference to the accompanying drawings, in which:

FIG. 15 shows an additional embodiment of a twist-grip shifter;

FIG. 16 shows a cross-section of the seal of FIG. 15;

FIG. 16A shows a view similar to FIG. 16, but shows an additional embodiment of a seal;

DESCRIPTION OF THE PREFERRED EMBODIMENTS

Figure 1:
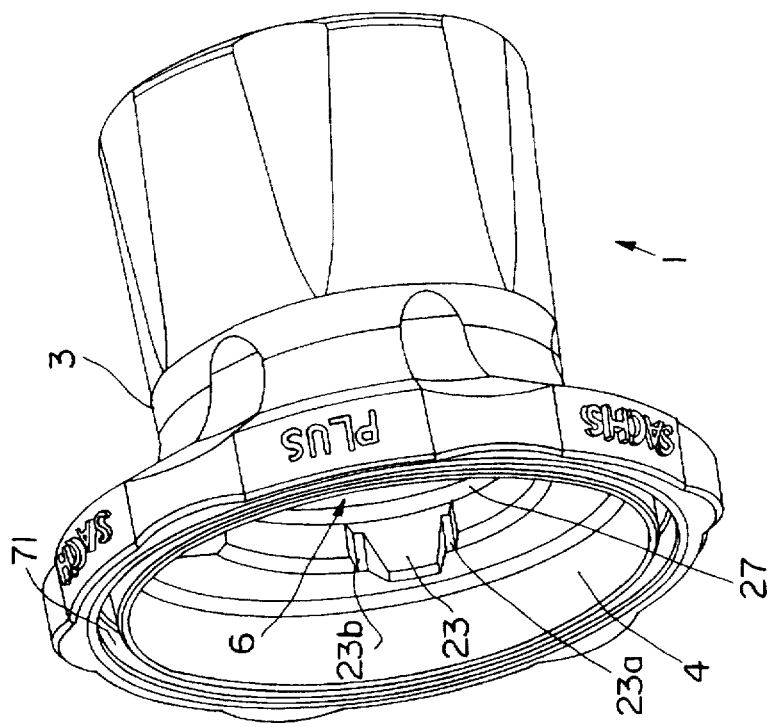
FIG. 1 shows an exploded view of a twist grip and a cable winding mechanism of a twist-grip shifter.
Figure 1:
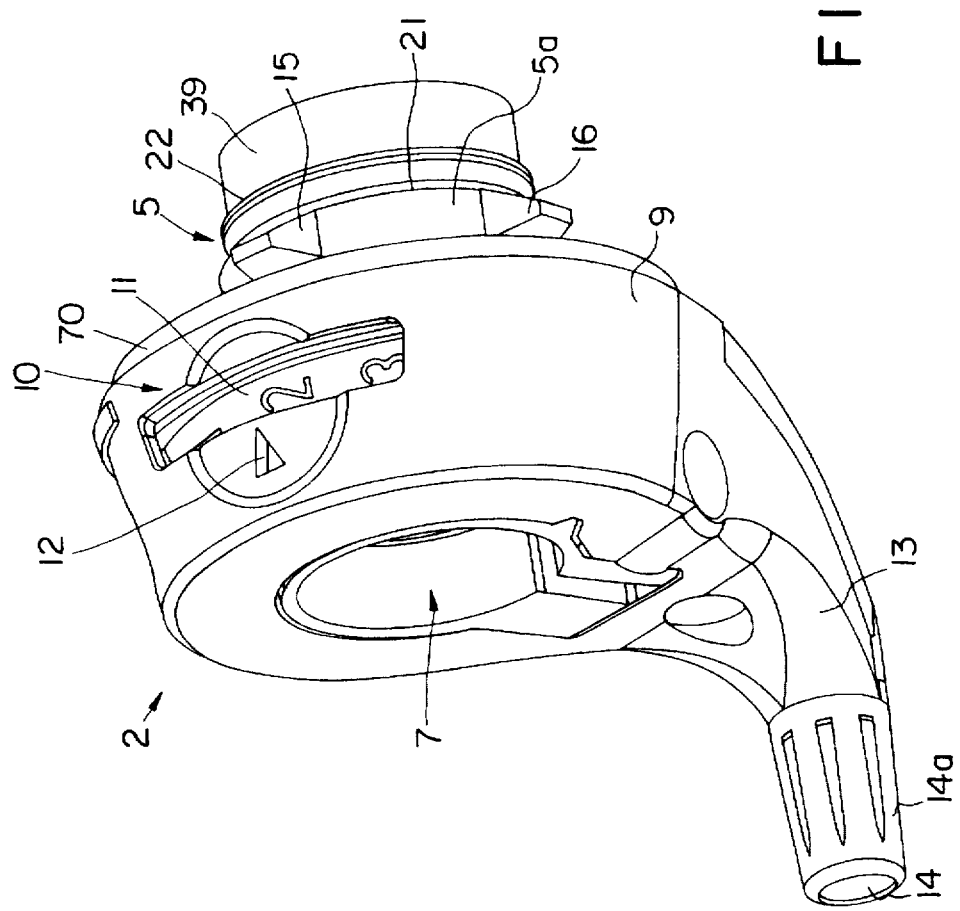

FIG. 1 shows an exploded view of a twist-grip shifter including a twist grip or grip part 1 and a cable winding portion 2, which cable winding portion 2 houses a cable winding mechanism or winding drum 5. The twist grip 1 can preferably have an exterior portion or grip part 3 which the rider can grip to shift the gears of the bicycle transmission, and an interior portion or twist part 4, which interior portion 4 can be configured for accommodating a tubular extension 5a of the cable winding mechanism 5. Each of the twist grip 1, the cable winding portion 2, and the cable winding mechanism 5, which cable winding mechanism 5 fits inside the cable winding portion 2, can have longitudinal holes 6, 7, and 5b (see FIG. 17), respectively, for accommodating a handlebar 61 (see FIG. 24). The exterior portion 3 of the twist grip 1 can, in accordance with one embodiment, be made of an elastic and/or rubber material, in order to provide a non-slip surface for the fingers and/or hand of the rider.

The exterior portion 3 and the interior portion 4 of the twist grip 1 can be firmly attached to one another, so that the twisting or rotational force applied by the rider to the exterior portion 3 is transmitted to the interior portion 4, in order to shift the gears of the bicycle.

The cable winding portion 2 can preferably include an outer housing 9, which housing 9 houses the cable winding mechanism 5 and other components. The housing 9 can include a shifting indicator 10 with a gear display 11, and an indicator 12, such as an arrow or other marking, so that the rider can visually surmise the current gear of the bicycle transmission. The bicycle transmission, for example, can be a hub transmission or a derailleur transmission such as that shown in FIG. 24. The cable winding portion 2 can also include an arm 13, through which arm 13 a shifting cable (not shown here but see FIG. 24) passes by means of a hole 14, and a cable connection or cap 14a. The cable connection 14a can preferably be fastened to the end of arm 13, for example by a threaded connection or other fastening means. The shifting cable can be connected on one end to the cable winding mechanism 5 by threading the cable through a guide 5c (see FIGS. 17, 18 and 19) and then threading the end of the cable through an orifice 5f (see FIG. 18) formed in the guide 5c. The cable can then be held in the orifice 5f by means of a cap 5e (see FIG. 22), which cap 5e can be fixed on the end of the cable, for example by crimping. Thus, the cable can be held in place by means of the cap 5e, which cap 5e can have a larger diameter than the orifice 5f. The orifice 5f can preferably have one end 5d which is flared or wider than the diameter of orifice 5f, in which end 5d the cap 5e can be located. The other end of the cable can then be connected to the transmission of the bicycle.

FIG. 1 shows the twist grip or grip part 1 and the cable winding portion 2 disassembled from one another in order to illustrate the seal between the two parts. Since it is highly desirable to prevent dirt and debris from entering the interior of the twist-grip shifter, a seal can preferably be provided adjacent the connection of the cable winding portion 2 and the twist grip 1. In accordance with the embodiment shown in FIG. 1, the seal can be a contactless or frictionless seal that includes a collar or flange 70 disposed about the connecting end of the cable winding portion 2, and a groove 71 formed in the connecting end of the interior portion 4 of the twist grip 1. The collar 70 can be integral with the housing 9, or can be a separate component and attached to the housing 9.

The collar 70 of the cable winding mechanism 2 can preferably be positioned with respect to the groove 71 so that when the cable winding portion 2 and the twist grip 1 are fastened to one another, as discussed in detail herebelow, the collar 70 essentially does not contact the walls of the groove 71. When fully assembled, the twist grip 1 can rotate along with the cable winding mechanism 5, which cable winding mechanism 5 is located inside the cable winding portion 2, and the collar 70 and housing 9 of the cable winding portion 2 can remain essentially stationary with respect to the twist grip 1 and the cable winding mechanism 5. Thus, the groove 71 can rotate with respect to the collar 70.

Figure 2:
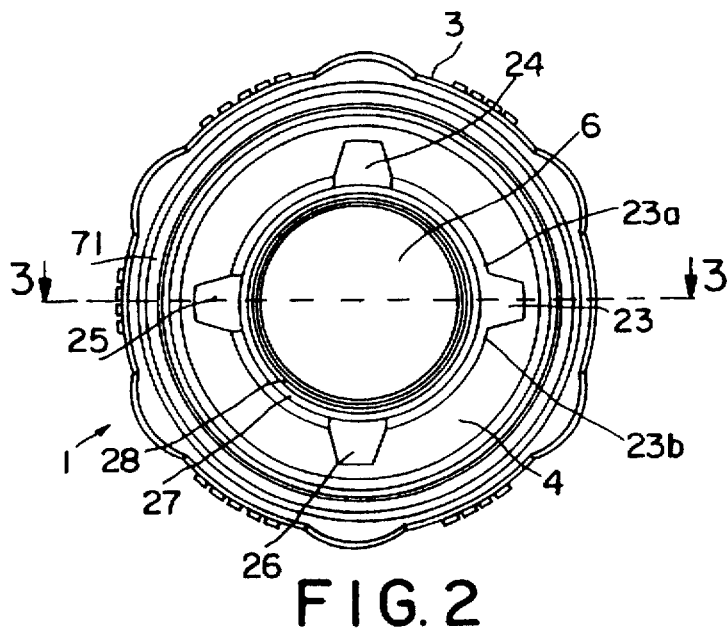
FIG. 2 shows an end view of the twist grip of the twist-grip shifter shown in FIG. 1.
Figure 3:
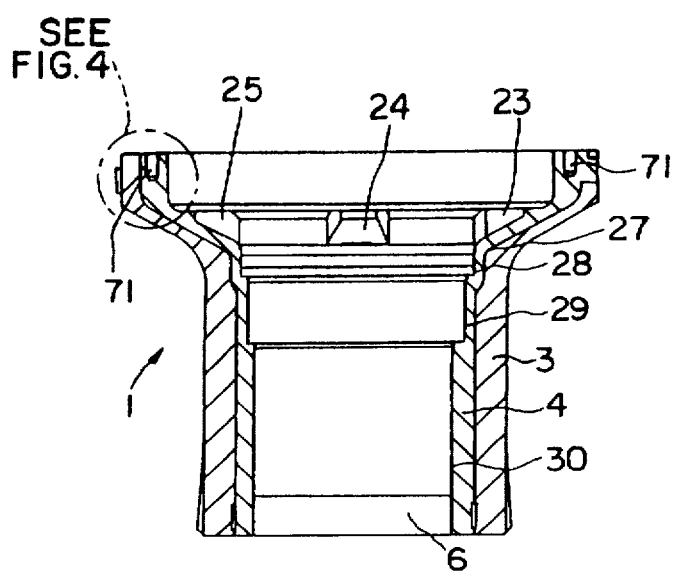
FIG. 3 shows a cross-section of the twist grip shown in FIG. 1.
Figure 4:
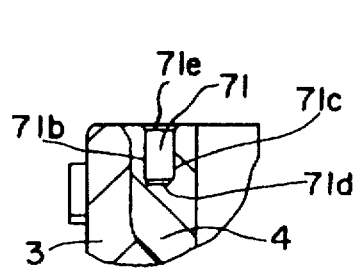
FIG. 4 shows an enlarged partial view of the twist grip shown in FIG. 3.
Figure 4A:
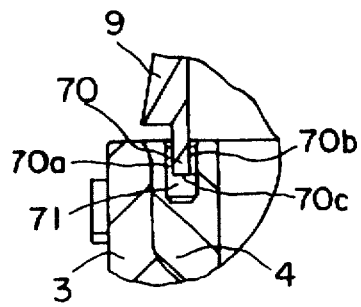
FIG. 4A shows essentially the same view as FIG. 4, but shows the collar.
Figure 5:
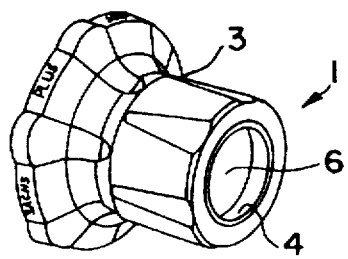
FIG. 5 shows an additional perspective view of the twist grip shown in FIG. 1.

FIGS. 2, 3, 4, 4A and 5 show additional views of the twist grip 1 shown in FIG. 1. Specifically, FIG. 2 shows an end view of the twist grip 1, wherein essentially the entire interior portion 4 can be seen. FIG. 3 shows a cross-section of the twist grip 1 along line 3—3 in FIG. 2, FIG. 4 shows an enlarged partial view of FIG. 3, FIG. 4A shows a view similar to FIG. 4 (but also shows the collar 70), and FIG. 5 shows an additional perspective view of the twist grip 1.

FIGS. 4 and 4A respectively show enlarged views of the groove 71 and the collar 70 disposed within the groove 71. The groove 71 can preferably have two essentially parallel side walls 71b and 71c, a bottom wall 71d, and a flared or angled end portion 71e. Collar 70 likewise can have a generally rectangular cross-section, with two essentially parallel side walls 70a and 70b, and a bottom wall 70c. As can be seen in FIG. 4A, the seal between the cable winding portion 2 and the twist grip 1 can be contactless, or virtually contactless, since the collar 70 preferably does not come into contact with the walls 71b, 71c, and 71d of groove 71.

Figure 6:
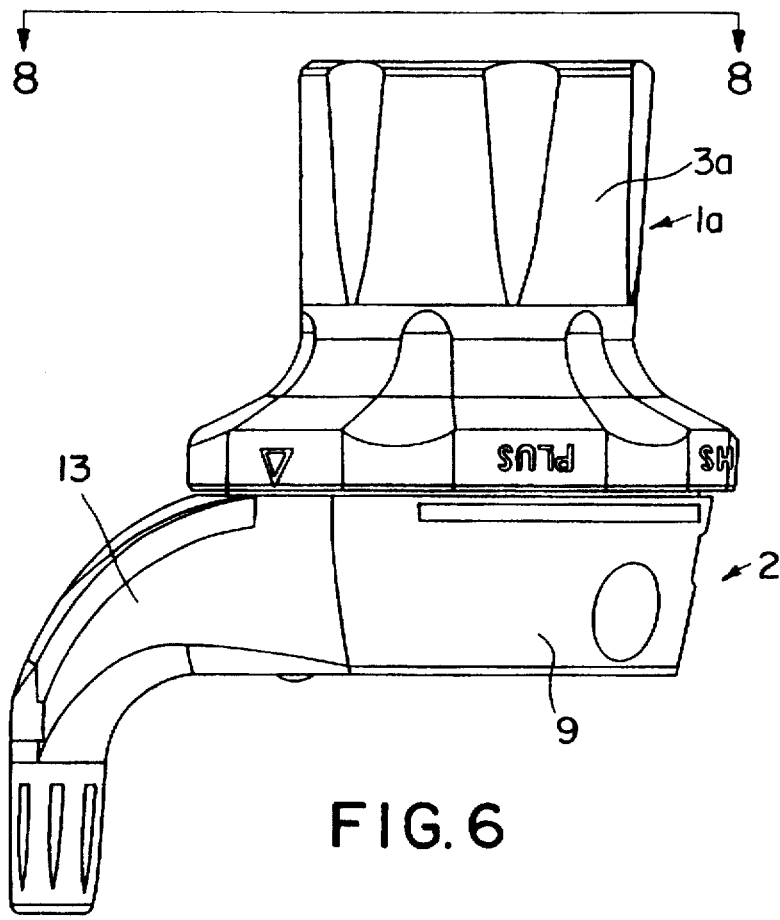
FIG. 6 shows a side view of the cable winding portion and a twist grip connected to one another.
Figure 7:
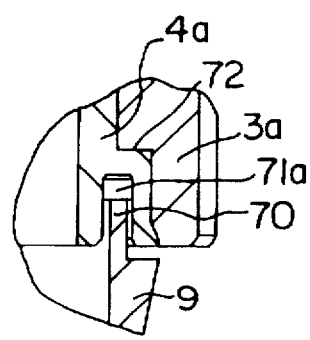
FIG. 7 shows a cross-section of the seal between the cable winding portion and the twist grip of FIG. 6.
Figure 8:
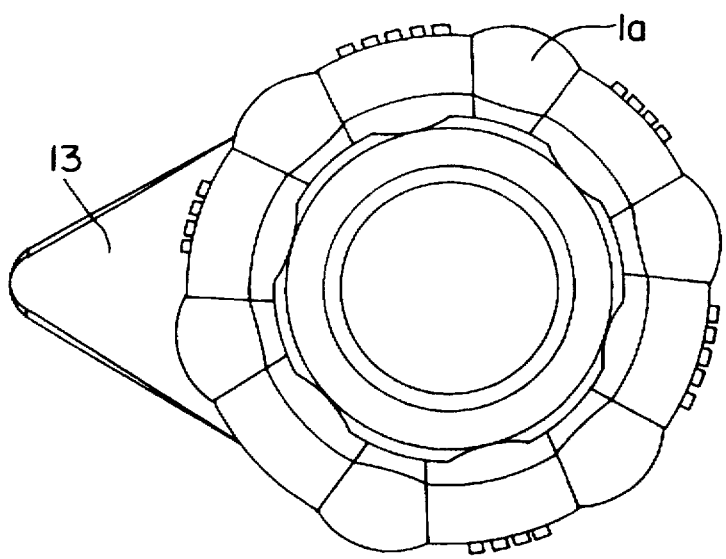
FIG. 8 shows a view of FIG. 6.

FIGS. 6, 7 and 8 show the cable winding portion 2 and an additional embodiment of a twist-grip 1a wherein the twist grip 1a has an end portion which is configured somewhat differently than that of the twist grip 1 shown in detail in FIGS. 4 and 4A. FIG. 6 shows a side view of the cable winding portion 2 and the twist grip 1a connected to one another, FIG. 8 shows view 8—8 of FIG. 6, and FIG. 7 shows a cross-section of the seal between the cable winding portion 2 and the twist grip 1a. Components of the twist grip 1a shown in FIG. 7 which are similar to components of the twist grip 1 have been given the same reference numbers plus an "a". Essentially the only difference between the end portion of the twist grip 1a and the end portion of the twist grip 1 is that the interior portion 4 of twist grip 1 (shown in FIGS. 4 and 4A) can preferably be rounded along its juncture with the exterior portion 3, and, in contrast, the end portion of twist grip 1a preferably has a stepped portion 72.

Figure 9:
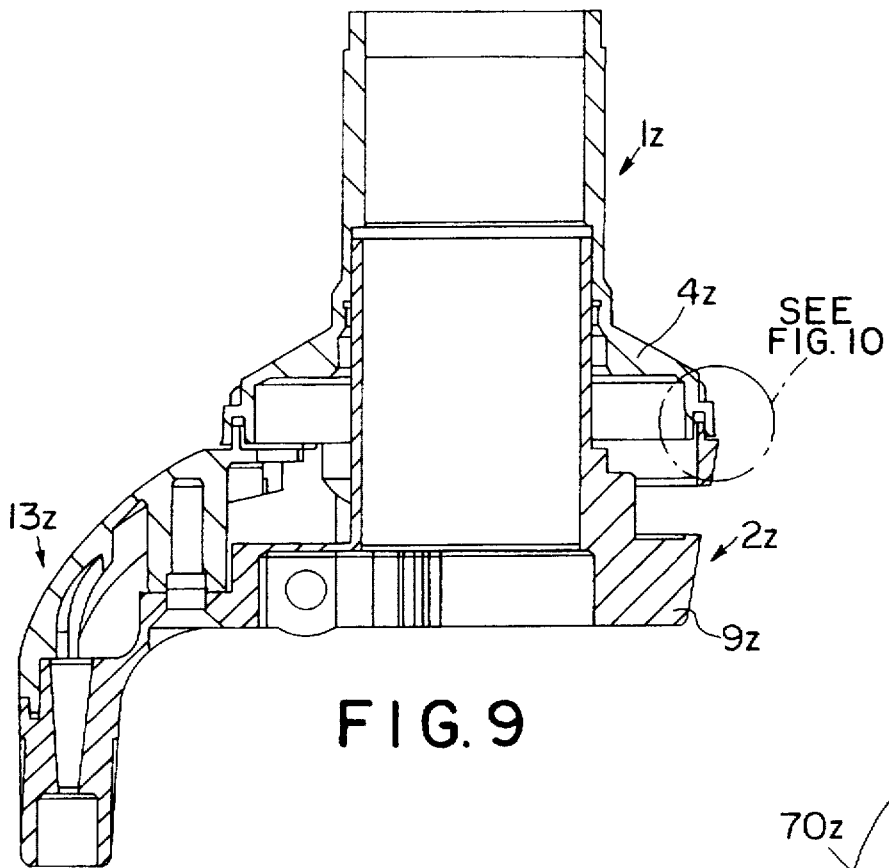
FIG. 9 shows an additional embodiment of a twist-grip shifter.
Figure 10:
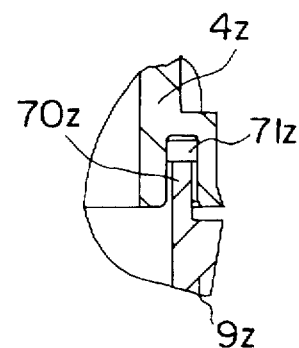
FIG. 10 shows an enlarged partial view of the seal between the cable winding portion and twist grip of FIG. 9.
Figure 11:
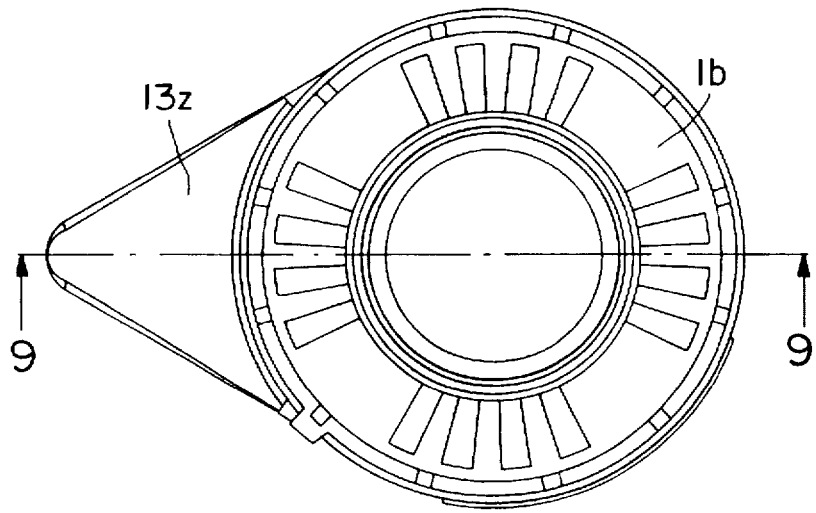
FIG. 11 shows an end view of the twist-grip shifter of FIG. 9.

FIGS. 9, 10 and 11 show an additional embodiment of a twist-grip shifter in accordance with the present invention, wherein FIG. 9 shows a cross-section taken along line 9—9 in FIG. 11, which FIG. 11 shows an end view, and FIG. 10 shows an enlarged partial view of FIG. 9, which shows the seal formed by twist grip 1z and cable winding portion 2z. Components which are similar to the components of the twist grip 1 and cable winding portion 2 have been given the same reference numbers plus a "z". The seal shown in FIG. 10 is similar to the seal shown in FIG. 7, with the exception that the embodiment shown in FIGS. 9, 10 and 11 does not include an exterior portion such as the exterior portion 3 and 3a shown in FIGS. 1 and 6, respectively.

FIGS. 12, 12A, 12B, 13 and 14 show an additional embodiment similar to that shown in FIGS. 1–5, but wherein the seal is not a contactless or frictionless seal, but can be considered a lip seal or friction seal. This type of seal is useful for bicycles which are primarily used for competitive events, such as racing for example, where debris can typically be much more common and plentiful. Thus, since the chance of debris entering the interior portion of the twist-grip shifter is typically greater with competition bicycles, a lip seal or friction seal may be highly desirable. Essentially the only difference between the embodiment shown in FIGS. 12–14 and the embodiment shown in FIGS. 1–5 is that the exterior portion 3x of FIGS. 12–14 can preferably be molded to have a flange or lip seal 73. The seal 73 can preferably extend towards the collar 70, over part of the groove 71, and can ultimately contact the collar 70.

Figure 12:
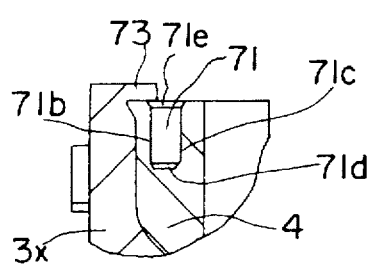
FIG. 12 shows a cross-section of the seal between the cable winding portion and an additional embodiment of a twist grip of a twist-grip shifter.
Figure 12A:
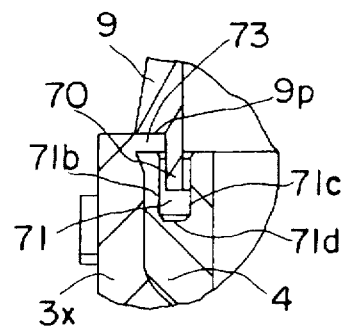
FIG. 12A shows a view similar to that of FIG. 12, but shows the collar.
Figure 13:
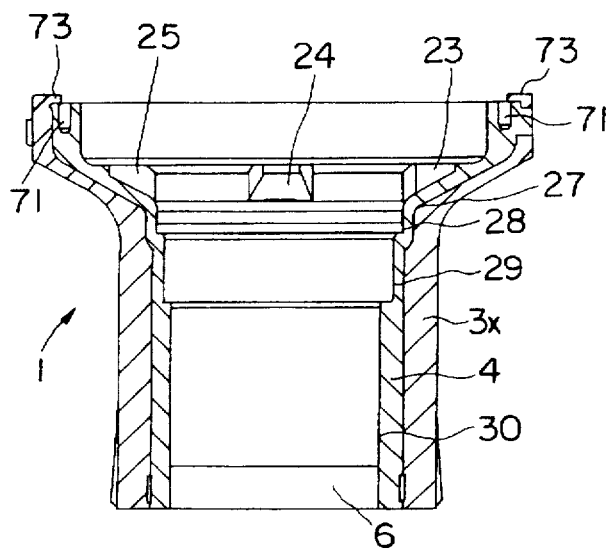
FIG. 13 shows a cross-section of the twist grip of FIGS. 12 and 12A.
Figure 12B:
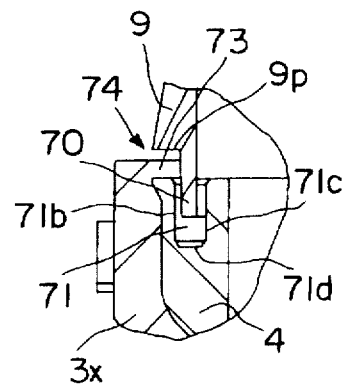
FIG. 12B shows a view similar to that of FIG. 12A, but shows an additional embodiment of a seal.
Figure 14:
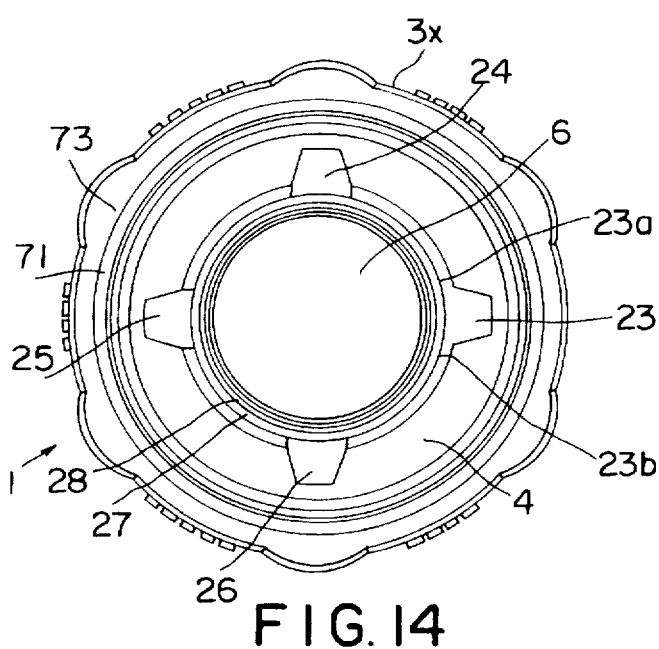
FIG. 14 shows an end view of the twist grip shown in FIGS. 12 and 13.

As shown in FIG. 12A, the lip seal 73 can also contact a portion 9p of the housing 9, however, this contact between the housing portion 9p and seal 73 may not be necessary. In the embodiment shown in FIG. 12B, a gap 74 can preferably be disposed between the housing portion 9p and the seal 73, if desired.

FIGS. 15, 16 and 16A show an embodiment similar to that shown in FIGS. 6–8, but wherein the embodiments shown in FIGS. 15–16A instead include a lip seal or friction seal. The embodiments shown in FIGS. 15, 16 and 16A include a flange or lip seal 75 which can be molded from the exterior portion 3y. The seal 75 can, as discussed above with regard to FIGS. 12–14, extend toward the collar 70, over part of the groove 71, and can contact the collar 70. Similar to the the embodiments of FIGS. 12–14, the lip seal 75 shown in the embodiment of FIG. 16 can contact housing portion 9p. The embodiment shown in FIG. 16A can preferably include a gap 76 between housing portion 9p and seal 75.

Other types of seals which may be utilized in accordance with the present invention are presented herebelow, near the close of the instant specification. Thus, it should be understood that the types of seals discussed hereinabove are only several variations of seals which could be used in accordance with the present invention, and that the present invention should not be interpreted as being limited to the specific seals mentioned hereinabove.

With regard to the connection between the grip part 1 and the cable winding portion 2, as mentioned briefly above, on the tubular extension 5a of the cable winding mechanism 5, there can preferably be four claws or projections 15, 16, 17 and 18, wherein only claws 15 and 16 can be seen in FIG. 1 due to the orientation of the cable winding portion 2. The two remaining claws 17 and 18 are shown in FIGS. 17–19, 22 and 23.

Figure 17:
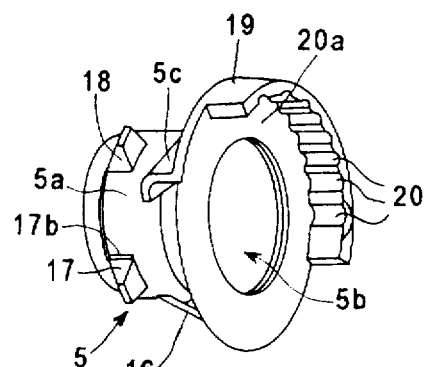
FIG. 17 shows a perspective view of the tubular extension of the cable winding mechanism.
Figure 18:
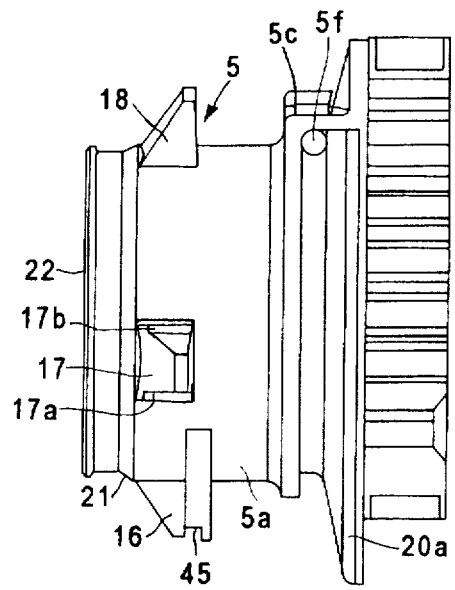
FIG. 18 shows a side view of the tubular extension of the cable winding mechanism.
Figure 19:
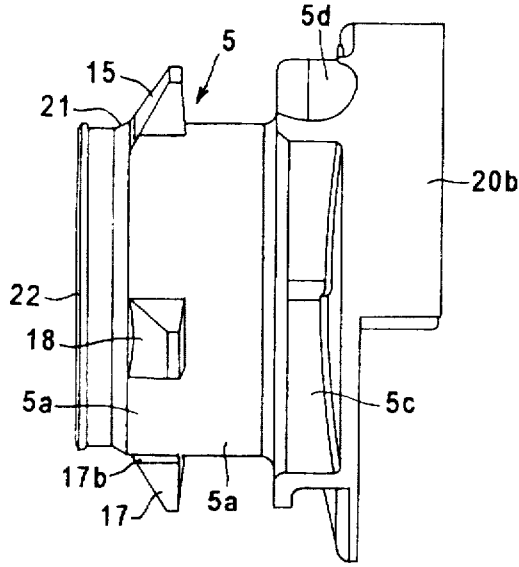
FIG. 19 shows an additional side view of the tubular extension of the cable winding mechanism, rotated by about 45° with respect to the view shown in FIG. 18.
Figure 20:
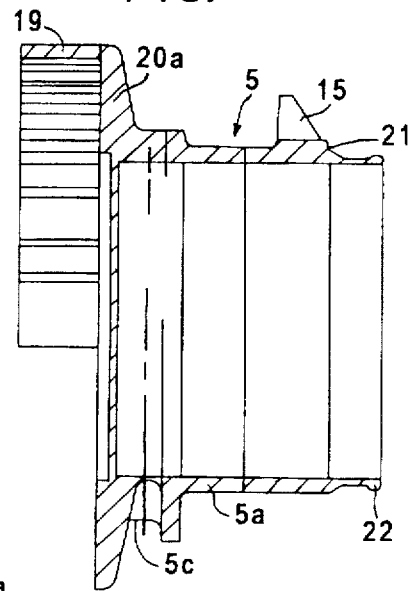
FIG. 20 shows a cross-section of the tubular extension of the cable winding mechanism.

FIG. 17 shows a perspective view of the tubular extension 5a of the cable winding mechanism 5. FIG. 18 shows a side view of the tubular extension 5a. FIG. 19 shows an additional side view of the tubular extension 5a rotated by about 45° from the view shown in FIG. 18. FIG. 20 shows a cross-section of the tubular extension 5a taken adjacent claw 15, and FIG. 21 shows an end view of the tubular extension 5a.

Figure 21:
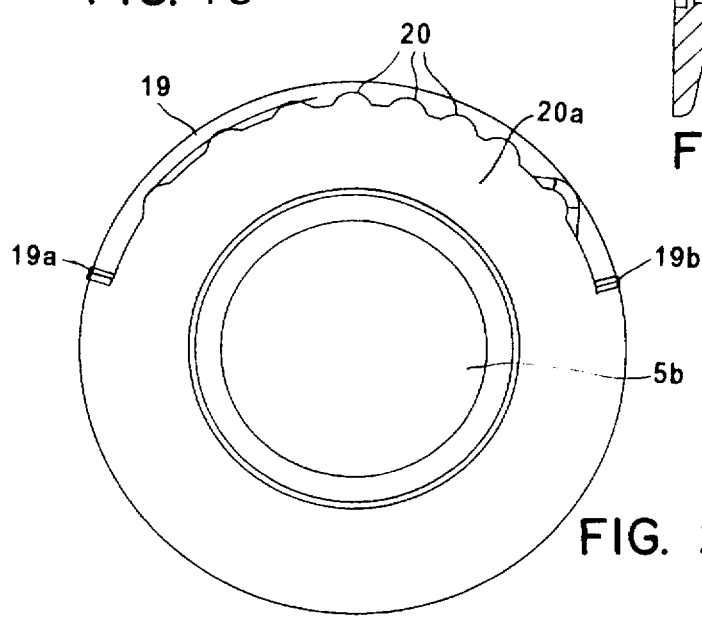
FIG. 21 shows an end view of the tubular extension of the cable winding mechanism.

FIG. 21 also shows a latching element or detent element 19 having detents or notches 20, which latching element 19 is part of the internal shifting mechanism of the twist-grip shifter. The latching element 19 can, in accordance with one embodiment of the present invention, be part of, or integral with, the tubular extension 5a of the cable winding mechanism 5, and a disk portion 20a can serve to connect the latching element 19 and the tubular extension 5a to one another. Of course, latching element 19, tubular extension 5a, and disk portion 20a could also be separate components from one another, and could then be attached to one another by adhesive or other fastening means. The guide 5c discussed immediately above can be disposed on, and can preferably be part of, the disk portion 20a. Further, the side 20b of the latching element 19 which faces outwardly, opposite from the notches 20, can preferably have gear markings, such as numbers, which numbers, when the twist-grip shifter is assembled, can be seen through the gear display 11 (see FIG. 1). In addition, located at each of the two ends of the latching element 19, there can also be projections or stops 19a and 19b (see FIGS. 21 and 23), which stops 19a and 19b can serve to limit the rotation of the cable winding mechanism 5 within the housing 9, by interacting with corresponding stops inside the housing 9 (not shown here). The particular functioning of a latching element or detent element similar to the latching element 19 is discussed further below with reference to FIGS. 25–32.

Figure 22:
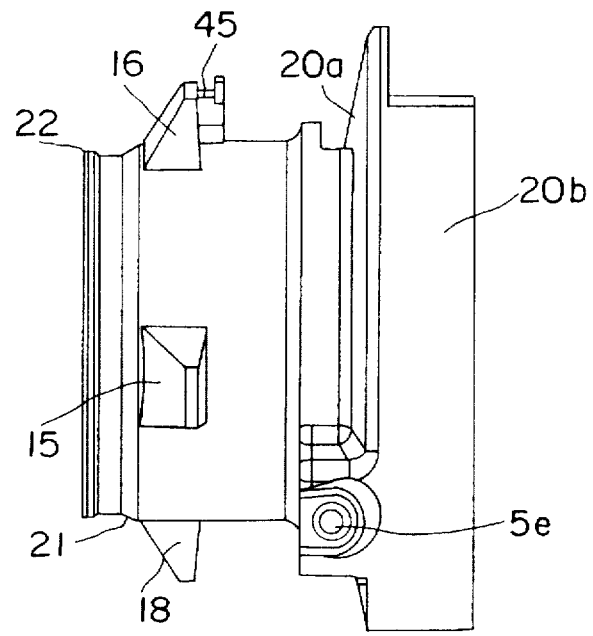
FIG. 22 shows an additional side view of the tubular extension of the cable winding mechanism, rotated by about 45° from the view shown in FIG. 19.
Figure 23:
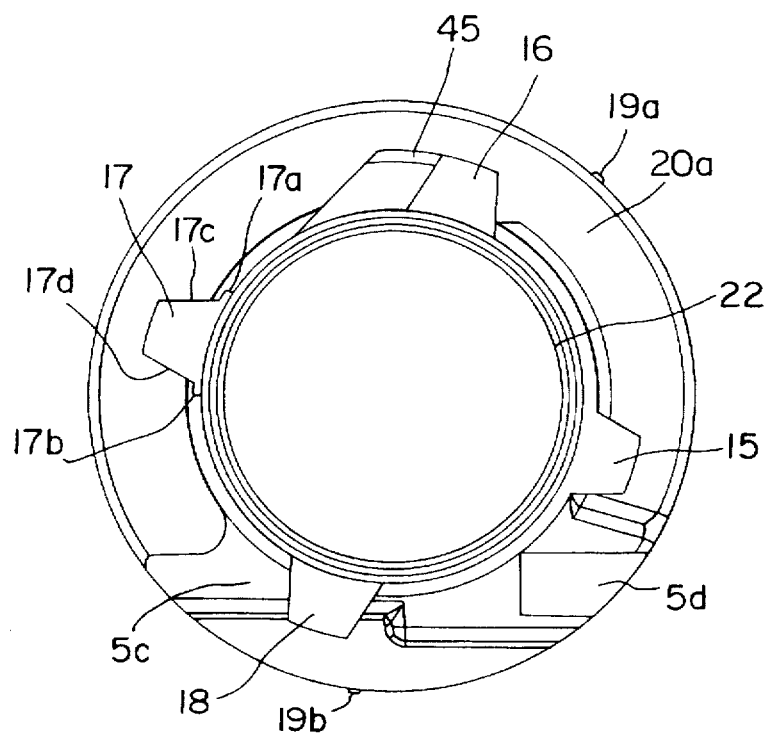
FIG. 23 shows an additional end view of the tubular extension of the cable winding mechanism, opposite of the end view shown in FIG. 21.

FIG. 22 shows another side view of the tubular extension 5a, rotated by about 45° from the view shown in FIG. 19. FIG. 23 shows an additional end view of the tubular extension 5a, opposite of the end view of the tubular extension 5a shown in FIG. 21.

In order to ensure the correct installation of the cable winding mechanism 5 of the cable winding portion 2 into the twist grip 1, one of the claws 15, 16, 17 or 18, in this particular case claw 17, can have a somewhat different configuration than that of the other claws 15, 16 and 18. Claw 17 can therefore have stepped portions 17a and 17b, which stepped portions 17a and 17b can preferably be located at the base of claw 17 (i.e. where claw 17 joins tubular extension 5a), and on both sides 17c and 17d of claw 17 (as best shown in FIG. 23). Of course other configurations of claw 17 would be within the scope of the present invention, and stepped portions 17a and 17b are presented as one example of a method for configuring claw 17 differently from the other claws 15, 16 and 18.

Twist grip 1, as shown in FIGS. 1, 2, 3 and 5, can, along the same lines, have four recesses 23, 24, 25 and 26 located in interior portion 4, in which recesses claws 15, 16, 17 and 18 of tubular extension 5a can be engaged. In FIG. 1 only one recess 23 can be seen, due to the particular orientation of the twist grip 1, but see FIG. 2. The recess 23 shown in FIG. 1 can preferably be configured to engage only with claw 17 of the tubular extension 5a, so that an incorrect installation of tubular extension 5a inside the twist grip 1 can be avoided. Thus, recess 23 can have stepped portions 23a and 23b for respectively engaging with stepped portions 17a and 17b of claw 17.

With regard to the above, a specific orientation of the twist grip 1 with respect to the cable winding portion 2 may be desirable if the twist grip 1 has a marking on the exterior portion 3 at its largest diameter, such as an arrow for example, which marking can be used to point to the current gear in gear display 11 located on housing 9 of the cable winding portion 2. In this case, the claw and recess which are to have the different configuration than that of the other claws and recesses should be selected so the location of the "special" claw and recess coordinate with the location of the gear display 11 on the housing 9. In other words, the location of the "special" claw and recess should be chosen so that the range of rotation of the twist grip 1 coordinates with the location of the gear display 11 on the cable winding portion 2. In this situation, the indicator 12 shown in FIG. 1 which is located on the housing 9 essentially would not be necessary, since a marking or gear indicator would instead be located on the exterior portion 3 of the twist grip 1. Thus, once the twist grip 1 is connected to the cable winding portion 2, the marking on the twist grip 1 can be utilized to indicate the current gear of the bicycle transmission by pointing to a gear number shown in the gear display 11.

Alternatively, the above-discussed marking could simply be used to indicate the location where the cable winding portion 2 and the twist grip 1 can be disconnected from one another.

In addition, it should be understood that a greater or lesser number of claws 15, 16, 17, and 18 and recesses 23, 24, 25 and 26 would be within the scope of the present invention, provided that the number of claws is sufficient for transmitting the torque applied by the rider's hand or fingers to the cable winding mechanism 5.

In accordance with one embodiment of the present invention, the claws 15, 16, 17 and 18 can preferably be located at about 90° intervals from one another along tubular extension 5a. Similarly, recesses 23, 24, 25 and 26 can also be located at about 90° intervals from one another inside interior portion 4. Of course, it should be understood that the above-mentioned angular orientations of the claws 15, 16, 17, and 18 and recesses 23, 24, 25 and 26 with respect to one another are only one example of one type of configuration in accordance with the present invention, and that other configurations and/or orientations of the claws 15, 16, 17 and 18 and recesses 23, 24, 25 and 26 would be within the scope of the present invention.

The tubular extension 5a of the cable winding mechanism 5 can also preferably have an angled or sloped circular portion 21 located near claws 15, 16, 17, and 18, and a bead or flange 22 (see FIGS. 1, 18, 19, 20 and 22) located next to angled portion 21. Angled portion 21 can engage with a corresponding angled portion 27 (see FIG. 1) located in the interior portion 4 of the twist grip 1, and the bead 22 can likewise engage with a groove 28 located inwardly of angled portion 27 (see FIGS. 2 and 3). Thus, once the cable winding mechanism 5 has been inserted into the twist grip 1, and the claws 15, 16, 17 and 18 are engaged in a corresponding recess 23, 24, 25 and 26, bead 22 can be engaged in groove 28, and angled portion 21 can fit against angled portion 27. Once inserted into the twist grip 1, the tubular extension 5a will then be non-rotationally connected to the twist grip 1, such that when the twist grip 1 is turned by the rider, the interior portion or twist part 4 rotates, and thus rotates the tubular extension 5a, and, since the shifting cable is connected to the cable winding mechanism 5 by means of the guide 5c discussed hereinabove, the shifting cable can be moved along with the tubular extension 5a in order to change the gears of the bicycle by means of a hub transmission or derailleur transmission (see FIG. 24).

In other words, and in accordance with one embodiment of the present invention, one end of the control or shifting cable can preferably be fastened to the hub or derailleur transmission of the bicycle. This end of the cable can be biased by a spring or similar device in the bicycle transmission. The other end of the cable can be connected to the cable winding mechanism 5 by means of orifice 5f and guide 5c as discussed above. Thus, when for example, the rider upshifts (i.e. shifts from a lower gear to a higher gear), the cable is essentially released from the previous gear position, and can essentially be "unwound" from the tubular extension 5a of the cable winding mechanism 5. This motion of the cable can be assisted by the spring in the transmission which pulls on the cable. For this movement, i.e. upshifting, relatively little force is typically needed on the twist grip 1, so the portion of the twist grip 1 with the smaller diameter can preferably be used by the rider. Oppositely, when the rider downshifts (i.e. shifts from a higher gear to a lower gear), the cable is "wound" around the tubular extension 5a of the cable winding mechanism 5, against the force of the transmission spring. For this movement, i.e. downshifting, a larger force is typically needed on the twist grip 1, so the portion of the twist grip 1 having the larger diameter can be used by the rider in this situation for a more effective transmission of torque.

As best seen in FIG. 3, the interior portion 4 of the twist grip 1 can also have two stepped portions 29 and 30, located inwardly from groove 28. Stepped portion 29 can preferably have a smaller diameter than does the groove 28, and a larger diameter than stepped portion 30.

Figure 24:
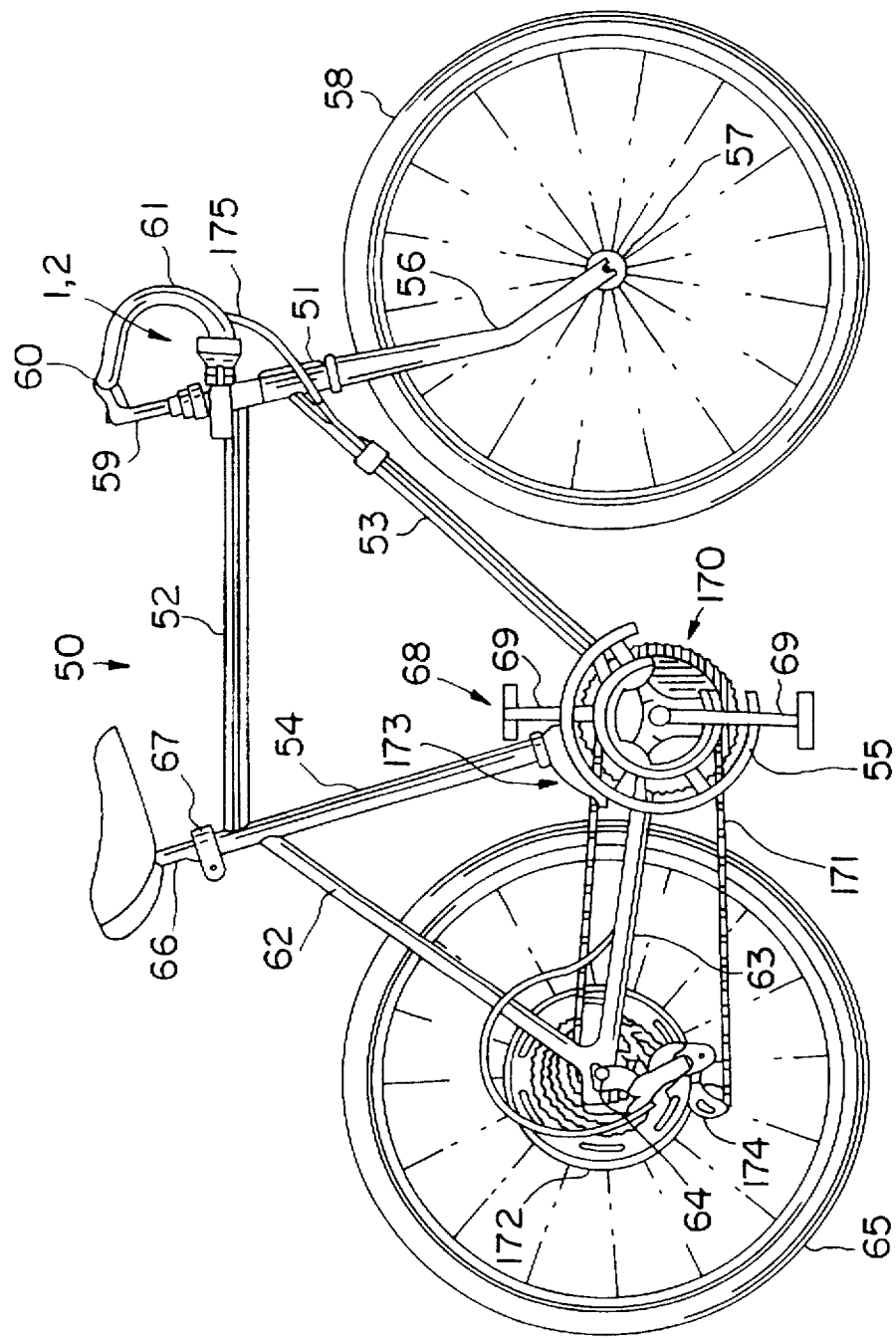
FIG. 24 shows one example of a bicycle and bicycle transmission incorporating the present invention.

FIG. 24 shows one example of a bicycle 50, in which a rear derailleur mechanism can be actuated by a rear twist-grip shifter in accordance with the present invention, and a two-chain front derailleur mechanism which can be actuated by a front twist-grip shifter in accordance with the present invention. It should be understood that the description which follows is presented only as an example of one type of bicycle and transmission system in which the present invention could be utilized. Thus, the present invention could also be utilized with other types of bicycles and bicycle transmissions, such as hub transmissions.

The bicycle 50 has a primary frame which is generally triangular in shape, and which includes a head tube 51, a generally horizontal top tube 52 connected at its front end to head tube 51, a main down tube 53 extending downwardly and rearwardly from head tube 51, and a seat tube 54 connected to the rear end of top tube 52 and extending downwardly and forwardly therefrom. Main down tube 53 and seat tube 54 are joined at their lower ends to bottom bracket 55, shown in phantom, within which bottom bracket 55 the pedal crank is horizontally journalled.

A front fork 56 defines the axis 57 of front wheel 58. A steering tube (not shown) at the upper end of front fork 56 extends upwardly into head tube 51, and is wedge-clamped to a handlebar stem designated 59, which stem 59 extends down into the steering tube within head tube 51. Handlebar stem 59 includes a handlebar clamp 60 at its upper end for gripping handlebar 61. The handlebar 61 shown in FIG. 24 is of the traditional drop bar type, although it is to be understood that the present invention is equally applicable to virtually any type of bicycle handlebar.

A down fork 62 consisting of left and right seat stays extends downwardly and rearwardly from the upper portion of seat tube 54, and a bottom fork 63 consisting of left and right chain stays extends rearwardly from bottom bracket 55. The left sides of down fork 62 and bottom fork 63 are connected at their rear ends, and similarly the right sides of down fork 62 and bottom fork 63 are connected at their rear ends, and these rear connections support rear wheel dropouts which define the axis 64 of rear wheel 65.

A seat stem 66 is engaged in the upper end of seat tube 54, and is releasably secured by a seat clamp 67. The pedal crank, generally designated 68, is rotatably journalled in bottom bracket 55, and includes right and left crank arms 69. A chain wheel cluster designated 170 is rigidly supported on pedal crank 68, and constitutes the sprocket cluster of the front derailleur assembly. Most commonly, the chain wheel cluster will embody two chain wheels, although it is also common to have chain wheel clusters with three chain wheels. An endless drive chain 171 transmits power from the chain wheel cluster 170 to a multiple freewheel 172 that is operatively connected to the rear wheel hub mechanism in a conventional manner.

A front derailleur mechanism designated 173 cooperates with chain wheel cluster 170 to shift chain 171 laterally between two chain wheels of cluster 170, down-shifting from the smaller chain wheel to the larger chainwheel, or up-shifting from the larger chain wheel to the smaller chain wheel. A rear derailleur mechanism designated 174 is pivotally connected to the frame proximate the right side portions of down fork 62 and bottom fork 63 for shifting chain 171 laterally from sprocket to sprocket of the multiple freewheel 172. A front control cable (not shown) operatively connects a front twist-grip shifter (not shown) in accordance with the present invention to the front derailleur mechanism 173 such that the front twist-grip shifter cooperates with and controls the shifting of the front derailleur mechanism 173. Similarly, a rear control cable 175 operatively connects a rear twist-grip shifter, including twist grip 1 and cable winding portion 2 in accordance with the present invention, to the rear derailleur mechanism 174 such that the rear twist-grip shifter cooperates with and controls the shifting of the rear derailleur mechanism 174.

Figure 25:
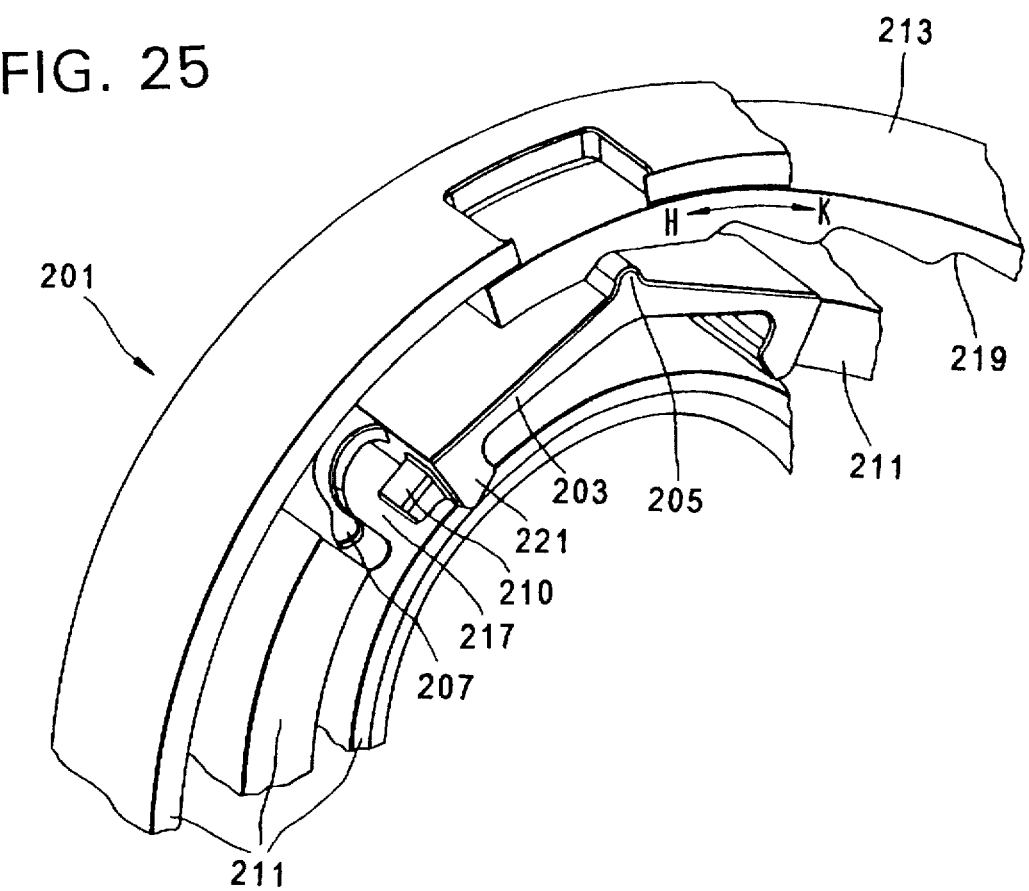
FIG. 25 shows a view in perspective of a shifter with a housing, a detent element and a detent spring with a transition spring.

FIG. 25 shows a latching or detent shifter for the actuation of a derailleur K. This detent shifter consists of a housing 211 which can be permanently connected or connected in a non-rotational manner to a part of a bicycle, a detent element 213 which is movably located inside this housing 211 and which is connected, possibly by means of a cable, on one hand to a manual actuator (designated H for direction indication in the figure) and on the other hand to the derailleur(designated K for direction indication in the figure) to be shifted to change the gear on the bicycle. The embodiment illustrated in FIG. 25 shows a twist-grip shifter located around a handlebar, the manual actuator H which is connected to the detent element 213. The detent element 213 is also connected to the first end of a control cable of a Bowden cable, while the second end of the control cable is connected to the derailleur K (see FIG. 26). The detent element 213 has detents 219 in which a lug 205 of a detent spring 203 is engaged. In this case, the detent spring 203 is in a stirrup-shape, and is supported by means of two projections 221 on the housing 211, by means of which the lug 205 is biased with respect to the detent element 213.

Figure 28:
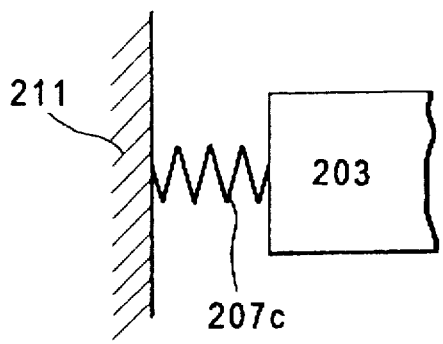
FIG. 28 illustrates an additional variant of the transition spring, in which it is realized in the form of a coil spring.

The detent spring 203 lies in a recess in a circumferential portion in the housing 211 (see FIG. 30), by means of which the detent spring 203 is fixed in position in the circumferential direction. This fixing includes some additional play, namely the transition distance 217, within which the detent spring 203 can move back and forth in the circumferential direction. To orient the detent spring 203 on a particular side, namely on the side facing the manual actuator H, there is a transition spring 207 which can preferably be connected in one piece with the detent spring 203, but which transition spring 207 can also be in the form of a spring plate 207b (FIG. 27), or as a separate transition spring in the form of a coil spring 207c (FIG. 28). There can also be a stop 210 which correctly limits the travel of the transition spring 207 and defines the transition distance 217.

Figure 29:
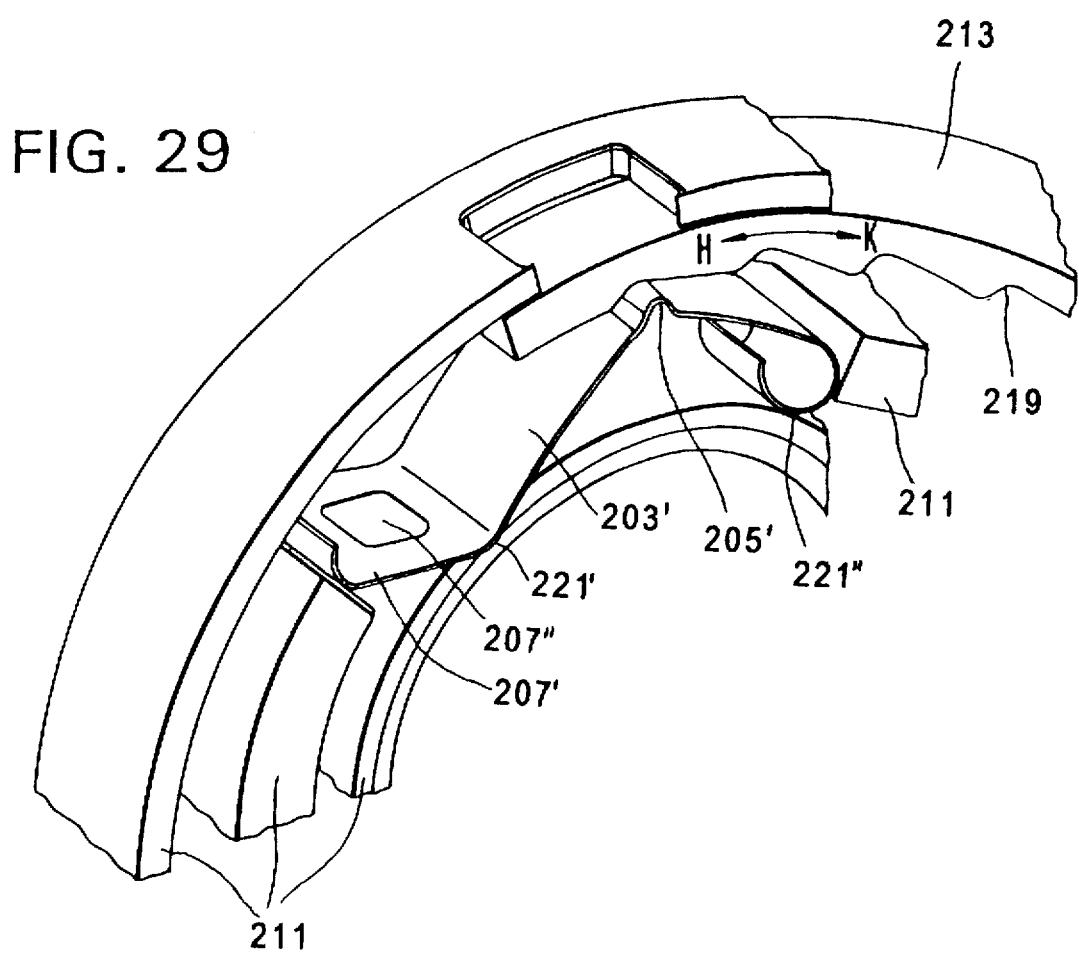
FIG. 29 shows a view in perspective as in FIG. 25 with a detent spring made of steel band material and an integrated transition spring.

FIG. 29 shows a detent spring 203' which is also in the shape of a stirrup and includes a leaf spring made of steel band material. This detent spring 203' also has a lug 205' to increase a retaining force with respect to the detents 219 in the detent element 213, which force results from a bias which is generated by two projections 221' and 221", which projections 221' and 21" are supported on the housing 211. At the projection 221', the detent spring 203' can be connected in one piece to a transition spring 207', which transition spring 207'can be applied against the flank on the housing 211. To increase the flexibility of the transition spring 207', notches 207" can be created which reduce the thickness of the band material in certain places and make possible a softer spring constant than the regular thickness of the band material of which the detent spring 203' is made.

Figure 26:
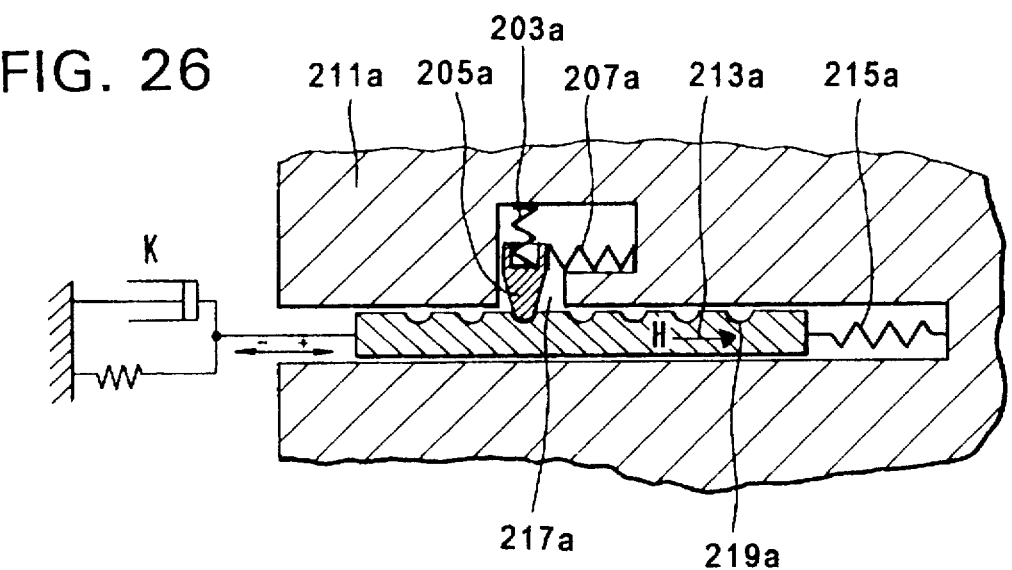
FIG. 26 shows a schematic illustration of the elements which participate in the shifting action.
Figure 27:
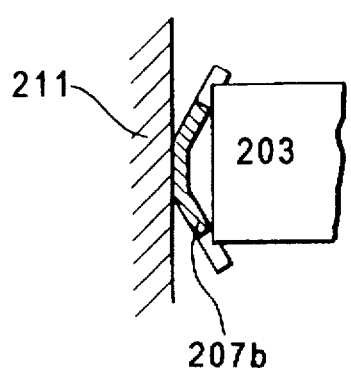
FIG. 27 illustrates a variant in which the transition spring is realized in the form of a plate spring.

FIG. 26 is a schematic diagram which illustrates the function of the detent shifter 201. By analogy to FIG. 25, the parts shown in FIG. 26 are identified by the same numbers plus the letter "a".

If the detent element 213a in the housing 211a is pulled by the manual actuator H toward the manual actuator H, the chain is to be shifted from a smaller sprocket to the next larger sprocket. On account of the lower tendency of the chain to ascend in this direction of shifting, the desired position of the derailleur K is overshot by the transition distance 217a, as a result of which the angle of ascent of the chain with respect to the larger sprocket increases and the shifting takes place. With the current quality of the shifting elements of derailleurs, it is sufficient to hold this transition position only for a very brief time, which means that the user need only shift to the next resistance, and then let go. Without noticing or even intending to do so, the rider has used the transition distance 217a.

As shown in FIG. 26, the detent element 213a can be connected to the housing 211a by means of a compensation spring 215a, which has the advantage that the shifting motion toward the next larger sprocket is made easier, since the compensation spring 215a, acting as a tension spring, counteracts the spring force of the parallelogram of the derailleur K. Also, the compensation spring 215a can be eliminated, since the process of shifting between the detent element 213a and the detent spring 203a is not directly affected. If the detent element 213a is then moved further toward the manual actuator H, first the transition spring 207a is pressed together by the detent lug 205a and the transition distance 217a is reduced by the detent lug 205a to the detent spring 203a. Essentially only then does the detent lug 205a jump out of the respective detent 219a and slide into the next detent 219a, whereby the position of the detent lug 205a on the detent spring 203a does not change. Only after the manual actuator H is released does the transition spring 207a, in connection with the return spring in the derailleur K, bring the detent element 213a back into the desired correct shifting position.

In other words, in accordance with one embodiment of an invention, when the manual actuator H pulls the detent element 213a, the detent lug 205a compresses the transition spring 207a. When the detent lug 205a fully reduces the transition distance 217a, the detent lug 205a rises out of the current detent 219a and slides into the next detent 219a. The rising of detent lug 205a compresses the detent spring 203a. The force of the detent spring 203a pushes the detent lug 205a into the next detent 219a. After the manual actuator H is released, the force of the transition spring 207a, along with effect of the return spring in the derailleur K, brings the detent element 213a back into the desired correct position wherein the derailleur K is aligned with the chain over the newly selected gear.

Figure 30:
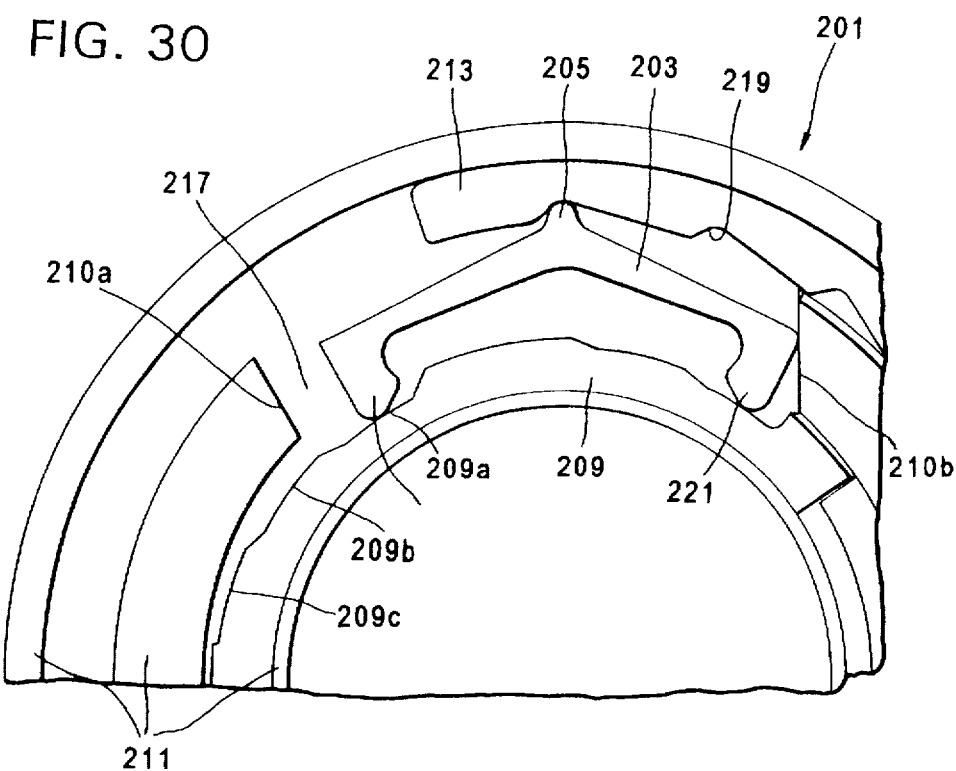
FIG. 30 shows a portion of a latching shifter with a housing, a latching element, a latching spring and a slide, with several bias stages.

One embodiment of an invention, as shown in FIG. 30, includes a detent or latching shifter 201 which can be, in particular, a twist grip shifter for the actuation of bicycle transmissions, such as hub transmissions or derailleurs. The latching shifter 201 can include a housing 211 and a detent or latching element 213, which latching element 213 can have detents or notches 219. The latching shifter 201 can also include a detent or latching spring 203. The latching spring 203 can preferably include a detent or latching lug 205 and two projections 221. The latching spring 203 can also have a slide 209 with various bias stages 209a, 209b, 209c etc. The bias stages 209a, 209b, 209c etc. can interact with the projections 221 of the latching spring 203.

The housing 211 can preferably be non-rotationally connected to the handlebar of the bicycle in the vicinity of the grip part. On the orbit of the latching spring 203, there can preferably be a recess, which recess can be formed by the stop surfaces 210a and 210b. In other words, there is a recess in a circumferential portion of the housing that is limited on one end by stop surface 210a and on the other end by stop surface 210b. The latching spring 203 can be located in this recess. The latching spring 203 can be in contact with the one stop surface 210a by means of the spring force generated by the bicycle transmission. Between the latching spring 203 and the other stop surface 210b, there can be a clearance, which clearance can represent a transition distance 217, whereby the position of the latching spring 203 in its rest position can be defined.

In accordance with one embodiment of an invention, therefore, the housing 211 can preferably be attached to the handlebar such that the housing 211 cannot rotate with respect to the area of the grip part of the handlebar. The latching spring 203 can preferably be located within the recess, which recess can include a space essentially between the stop surface 210a and the stop surface 210b. The latching spring 203 can orbit or move within this recess. One side of the latching spring 203 can preferably be biased against the stop surface 210b. The other end of the latching spring 203, which other end can face away from the stop surface 210b, can face toward the stop surface 210a. The transition distance 217 can thereby include the space or clearance between the end of the latching spring 203 and the stop surface 210a. The amount of clearance of the transition distance 217 can remain essentially constant when the latching spring 203 is in a rest position.

The recess in the housing 211 can be crossed or overrun by the latching element 213, which latching element 213 can preferably be connected to the rotational portion of the twist grip shifter. The latching element 213 can have several notches 219 facing the latching lug 205, as mentioned above, whereby a latching can occur when the latching lug 205 is essentially pressed with bias into the notches 219. This bias can be generated by the latching spring 203, which latching spring 203 can rest, by means of the two projections 221, on the slide 209. The slide 209 has the different bias stages 209a, 209b, 209c etc., each of which bias stages 209a, 209b, 209c etc. can lie on a different level with regard to the projections 221. The bias stages 209a, 209b, 209c etc. can be displaced in pairs, one after another, under the two projections 221, by changing the position of the slide 209.

Therefore, in accordance with one embodiment of an invention, the latching element 213 can be located along the outer portion of the recess, with reference to FIG. 30. The latching element 213 can rotate with respect to the rotational portion of the twist grip shifter. The latching element 213 can have several notches 219, which notches 219 can receive the latching lug 205 to thereby bias the latching spring 203 essentially between the latching element 213 and the slide 209. The latching spring 203 can include a pair of projections 221. The two projections 221 can simultaneously be displaced back and forth among the different bias stages 209a, 209b, and 209c etc. of the slide 209 by means of the rotation of the slide 209 in a clockwise or a counterclockwise direction with respect to FIG. 30.

Figure 31:
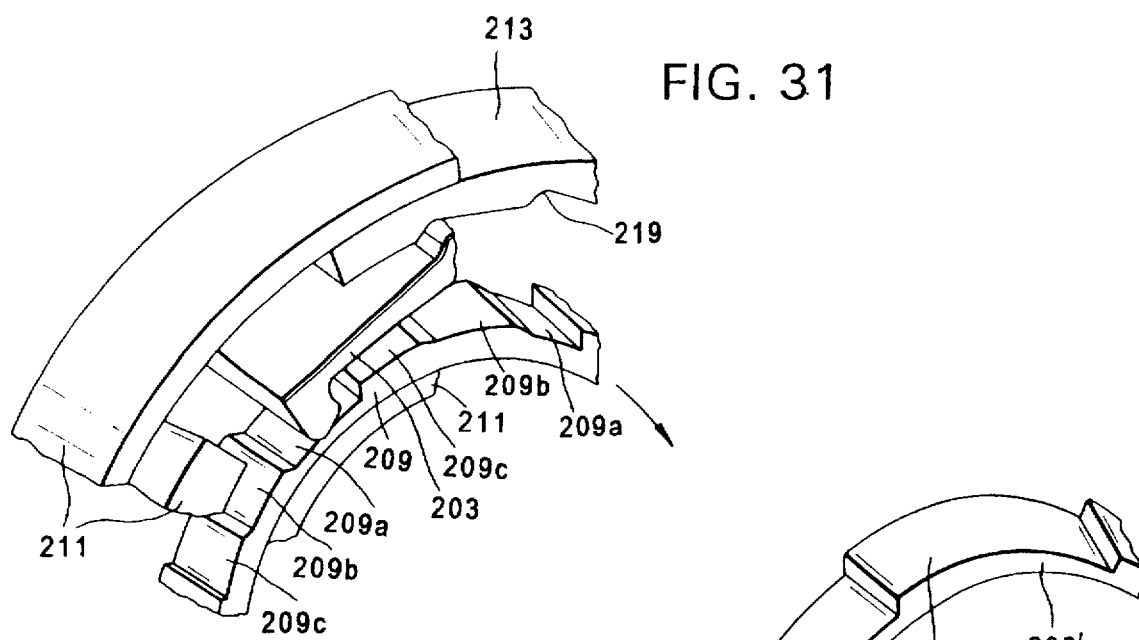
FIG. 31 shows a view in perspective of the portion of the latching shifter illustrated in FIG. 30, with a more detailed illustration of the slide.

In the position illustrated in FIGS. 30 and 31, the projections 221 of the latching spring 203 can each be considered to be on the bias stages 209a of the slide 209. In this position, the least bias is applied to the latching spring 203, which means that the latching element 213 can be pushed or pulled most easily from the retention position in the notch 219. If the slide 209 is rotated in the clockwise direction with respect to FIGS. 30 and 31, the projections 221 can be moved to the higher level of the subsequent bias stage 209b. As a result, the latching spring 203 can be essentially more strongly biased by the difference in level between the bias stages 209a and 209b, with the result that the latching spring 203 can develop a higher resistance against a rotational force. The retention force of the latching spring 203, when the bias stage 209c is subsequently moved under the projections 221 of the latching spring 203, can change accordingly.

Therefore, in accordance with one embodiment of an invention, when the two projections 221 are on the respective bias stages 209a, as shown in FIGS. 30 and 31, the least amount of biasing force can be applied to the latching spring 203. When the slide 209 is rotated in the clockwise direction, however, the two projections 221 can be biased against the respective bias stages 209b. As a result, because of the difference of levels between bias stages 209a and bias stages 209b, the latching spring 203 can thereby be more strongly biased between the latching element 213 and the slide 209. Similarly, when the slide 209 is further rotated in the clockwise direction, the two projections 221 can be biased against the respective bias stages 209c. As a result, because of the difference of levels between bias stages 209b and bias stages 209c, the latching spring 203 can thereby be even more strongly biased between the latching element 213 and the slide 209. When the rotation of the slide 209 successively displaces the two projections 221 from the biasing stages 209a, to the biasing stages 209b, and then to the biasing stages 209c, etc., the bias of the latching spring 203 between the latching element 213 and the slide 209 can accordingly provide a greater resistance to the force of rotation.

The bias stages 209a, 209b, 209c etc. can be selected so that the peripheral extensions of each of the bias stages 209a, 209b, 209c etc. can be large enough that the latching spring 203 can be displaced by the peripheral length of the transition distance 217, without the projections 221 leaving the respective bias stage 209a or 209b or 209c etc. In other words, the circumferential length of the bias stages 209a, 209b, and 209c can be at least the length of the transition distance 217. Therefore, the latching spring 203 can move throughout the transition distance 217 without the projections 221 being displaced to another of the bias stages.

In summary, and in accordance with one embodiment of an invention, to essentially prevent the projections 221 from being displaced from the corresponding bias stages 209a, 209b, or 209c etc., the length of each of the bias stages 209a, 209b, and 209c etc. can be sized with respect to the length of the transition distance 217 such that the length of the bias stages 209a, 209b, and 209c etc. can preferably be relatively longer than the length of the transition distance 217. As a result, if the latching spring 203 essentially travels toward and along the transition distance 217, the projections 221 of the latching spring 203 can be prevented from leaving the corresponding pair of biasing stages 209a, 209b, or 209c etc. because the longer lengths of each of the biasing stages 209a, 209b, and 209c etc. can thereby compensate for the travel of the latching spring 203 along the shorter length of the transition distance 217.

Figure 32:
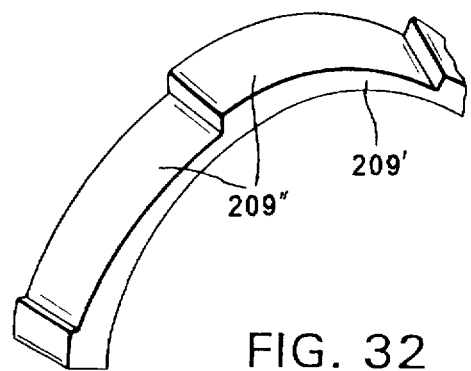
FIG. 32 shows a variant of the slide with the capability of continuously adjusting the bias of the latching spring.

FIG. 32 shows a slide 209' with contact surfaces 209", which contact surfaces 209" no longer include different bias stages. Each of the contact surfaces 209" can, however, include an inclined plane with a low angle of inclination, which has the special advantage that it can permit a continuous adjustment of the bias between the latching spring 203 and the latching element 213.

Therefore, in accordance with one embodiment of an invention, as shown in FIG. 32, each contact surface 209" of the slide 209' can include an arc-shaped or inclined surface. As a result, the height of one end of the contact surface 209" can be relatively shorter than the height of the other end of the contact surface 209" such that the height of the areas between the ends can thereby form an inclined plane of the contact surface 209". By realizing the contact surface 209" in the form of an arc-shaped or inclined plane, the bias of the latching spring 203 can be essentially continuously adjusted upon rotation of the slide 209'.

In general, with regard to the mode of operation of the latching shifter 201, it should be understood that the shifting motions can take place essentially exclusively by means of the latching element 213, since the latching element 213 can be connected on one hand directly to the twist grip, which twist grip can be actuated by the rider. And, on the other hand, the latching element 213 can be connected with the one end of a control wire of a Bowden cable, and the other end of the Bowden cable can be located on the adjustment mechanism of the derailleur, in which case the mechanism described here can change only the shifting resistance, in the order of the gears selected, with the ability to produce a stop in each gear, after the latching of the latching lug 205 in one of the notches 219 with the selective bias.

In accordance with one embodiment of an invention, therefore, the latching shifter 201 can operate by means of the motion of the latching element 213 since one end of the latching element 213 can be connected to the twist grip actuated by the rider. The latching element 213 can also be connected with one end of the Bowden cable, whereby the other end of the Bowden cable can preferably be connected to the derailleur to thereby adjust the shift resistance of the gears of the derailleur.

Types of lip seals which may be utilized in accordance with the present invention may be disclosed in the following U.S. Patents: No. 5,184,684 to Kohlman on Feb. 9, 1993; No. 5,209,497 to Von Bergen et al. on Sep. 5, 1991; No. 5,209,499 to Ruff et al. on May 11, 1993; No. 5,213,342 to Weber on May 25, 1993; No. 5,267,739 to Vaughan on Dec. 7, 1993; No. 5,324,046 to Tomatis on Jun. 28, 1994; and No. 5,370,404 to Klein et al. on Dec. 6, 1994.

Types of friction seals which may be utilized in accordance with the present invention may be disclosed in the following U.S. Patents: No. 5,186,548 to Sink on Feb. 16, 1993; No. 5,207,436 to Lederman on May 4, 1993; No. 5,244,113 to Stymiest on Sep. 14, 1993; No. 5,372,389 to Tam et al. on Jun. 22, 1993; No. 5,409,181 to Patrick on Jul. 26, 1993; and No. 5,417,441 to Hill on May 23, 1995.

Types of contactless seals which may be utilized in accordance with the present invention may be disclosed in the following U.S. Patents: No. 5,228,700 to Biesold et al. on Mar. 2, 1992; and No. 5,368,314 to Victor et al. on Nov. 29, 1994.

Types of shifting actuators and components thereof which may be utilized in accordance with the present invention may be disclosed in the following U.S. Patents: No. 4,055,093 to Ross; No. 4,194,408 to Hedrich; No. 4,201,095 to Cirami; No. 4,267,744 to Yamasaki; No. 4,384,864 to Bonnard; No. 4,504,250 to Juy; No. 4,599,079 to Chappell; No. 4,693,700 to Chappell; No. 5,033,991 to McLaren; and No. 5,135,441 to Gelbien.

Types of transmissions for bicycles, and components thereof, which may be utilized in accordance with the embodiments of the present invention may be disclosed in the following U.S. Patents: No. 3,944,253 to Ripley on Mar. 16, 1976, entitled "Infinitely Variable Transmission for Pedal-Driven Vehicles"; No. 4,973,297 to Bergles on Nov. 27, 1990, entitled "Multispeed Drive Hub With More Than Three Speeds"; No. 4,721,015 to Hartmann on Jan. 26, 1988, entitled "Three Stage Planetary Driving Wheel for Pedal Powered Vehicles"; No. 4,063,469 to Bergles on Dec. 20, 1977, entitled "Multiple Speed Hub for a Vehicle Wheel"; No. 4,727,965 to Zach et al.; No. 4,721,013 to Steuer et al.; No. 4,651,853 to Bergles et al.; No. 4,628,769 to Nagano; No. 4,400,999 to Steuer; No. 5,273,500; and No. 5,443,279 to Nurnberger.

Examples of bicycle derailleur cable actuating systems which may be utilized in accordance with the present invention may be found in the following U.S. Patents: No. 5,197,927 to Patterson et al. on Mar. 30, 1993; No. 5,102,372 to Patterson et al. on Apr. 7, 1992; and No. 4,938,733 to Patterson on Jul. 3, 1990.

Examples of bicycles, in which the embodiments of the present invention may be employed, may be found in the following U.S. Patents: No. 5,324,059, which issued to Bryne on Jun. 28, 1994; No. 5,312,125 which issued to Tse-acu-a-o-shu on May 17, 1994; No. 5,242,182, which issued to Bezerra et al. on Sep. 7, 1993; and No. 5,240,268, which issued to Allsop et al. on Aug. 31, 1993.

Examples of derailleurs, which may be utilized in accordance with the embodiments of the present invention, may be found in the following U.S. Patents: No. 4,439,171, which issued to Bergles on Mar. 27, 1984; No. 4,231,264, which issued to Bergles on Nov. 4, 1980; No. 4,183,255, which issued to Leiter on Jan. 15, 1980; and No. 3,927,904, which issued to Bergles on Dec. 23, 1975.

Examples of methods for making decorated injection moldings which may be utilized in accordance with the present invention can be found in U.S. Pat. No. 4,427,615 entitled "Method of Making Injection Moulded Plastic Objects with Imbedded Decorative and/or Descriptive Prints".

Examples of methods for molding rubber onto a plastic molding which may be utilized in accordance with the present invention can be found in U.S. Pat. Nos.: 4,896,922 to Guthe on Jan. 30, 1990, entitled "Plastic Wheel Assembly"; 4,970,103 to Wolf et al. on Nov. 13, 1990, entitled "Preformed Part Made of Plastics with Integrally Formed Rubber Elastic Parts"; 4,743,422 to Kalriss-Nielsen et al. on May 10, 1988, entitled "Method for Manufacturing a Sealing Body for a Pipe Joint"; and 5,302,336 entitled "Method for Producing Molded Hose Branches from Rubber and a Hose Produced by the Method".

An additional example of a method for making a molded article having a coating can be found in U.S. Pat. No. 4,961,894 entitled "Process for Producing Synthetic Resin Molded Articles".

Examples of injection molding machines and/or methods which can be utilized in accordance with the present invention can be found in U.S. Pat. No. 4,954,074 entitled "Injection Bladder Press", U.S. Pat. No. 5,059,113 entitled "Injection Molding Apparatus", U.S. Pat. No. 5,087,190 entitled "Multiplunger Molding Machine for Liquid Silicone Rubber", U.S. Pat. No. 4,540,359 entitled "Injection Molding Machine", U.S. Pat. No. 3,921,963 entitled "Injection Molding Machine Construction and Method of Operation", U.S. Pat. No. 3,904,078 entitled "Injection Molding Machine having a Programming Device and a Method of Operating the Machine", and U.S. Pat. No. 5,200,208 entitled "Multi-station Rubber Injection Molding Machine".

Examples of injection moldable thermoplastic materials which may be utilized in accordance with the present invention can be found in U.S. Pat. Nos.: 4,902,738 to Mitsuno et al. on Feb. 20, 1990, entitled "Thermoplastic Elastomer Composition and Process for Producing Same"; 5,100,960 to Grigo et al. on Mar. 31, 1992, entitled "Thermoplastic Molding Composition of a Polysiloxane Block Copolycarbonate and a Polycarbonate Based on Certain Dihydroxydiphenylcyclo Alkanes"; 5,187,230 entitled "Rubber-modified Polymer Blends of Polycarbonate and PETG"; and 5,095,063 to Okada et al. on Mar. 10, 1992, entitled "Polypropylene Composition".

Examples of injection moldable rubber compositions which may be utilized in accordance with the present invention can be found in U.S. Pat. Nos.: 5,082,886 to Jeram et al. on Jan. 21, 1992, entitled "Low Compression Set, Oil and Fuel Resistant, Liquid Injection Moldable, Silicone Rubber"; 5,010,136 to Ohmae et al. on Apr. 23, 1991, entitled "Process for Producing Impact-resistant Polyamide Resin Compositions"; and 5,145,897 to Levif et al. on Sep. 8, 1992, entitled "Rubbery Composition and Polynorbornene-based Thermoplastic Elastomer with Improved Heat Stability".

Examples of injection-compression molding machines and/or methods can be found in U.S. Pat. No. 5,059,364 entitled "Injection-Compression Molding Machine and Method of Molding by Using the Machine", U.S. Pat. No. 5,057,255 entitled "Molding Method and Molding Apparatus in an Injection-Compression Molding Machine", and U.S. Pat. No. 5,044,925 entitled "Injection-Compression Mold".

An example of a process control can be found in U.S. Pat. No. 4,146,601 entitled "Injection Mold Process Control".

Examples of hot runner or nozzle valves or shutters can be found in U.S. Pat. No. 5,078,589 entitled "Multicavity Injection Molding Apparatus having Precision Adjustment and Shut Off of Injection Flow to Individual Mold Cavities", U.S. Pat. No. 5,071,340 entitled "Cooling Arrangement for Valve Stem Gates in Hot Runner Injection Molding Machine Systems", and U.S. Pat. No. 5,067,893 entitled "Injection Molding Apparatus with Shut Off Valve Pin Actuation System".

Examples of a clamping apparatus can be found in U.S. Pat. No. 5,066,217 entitled "Clamping Apparatus for an Injection Molding Machine", U.S. Pat. No. 4,781,568 entitled "Mold Clamping Unit of Injection Molding Machine", and U.S. Pat. No. 4,545,756 entitled "Hydraulic Clamping Apparatus for an Injection Molding Machine".

Examples of a transport apparatus and gripper device can be found in U.S. Pat. No. 5,087,315 entitled "Fabric Lifting Apparatus and Method", U.S. Pat. No. 5,056,246 entitled "Device for Taking Trousers Off an Ironing Machine", U.S. Pat. No. 5,048,815 entitled "Gripper Device on Sheet-Feed Rotary Printing Machines", and U.S. Pat. No. 4,889,221 entitled "Vending Machine for Newspapers or Periodicals".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bicycle, said bicycle comprising:

a frame;

at least two wheels, said at least two wheels comprising at least a front wheel and a rear wheel;

said at least two wheels being disposed on said frame;

a device to propel at least one of said front wheel and said rear wheel;

said device to propel comprising:
   a chain;
   at least two sprockets to engage said chain;
   at least two pedals, said at least two pedals being connected to one of said at least two sprockets;

a seat, said seat being disposed on said frame;

a handlebar for steering said bicycle;

a bicycle gearing system, said bicycle gearing system comprising:
   a device to shift gearing associated with at least one of: said front wheel and said rear wheel of said bicycle;
   a shift actuator mounted on said handlebar, generally coaxially with said handlebar;
   at least one control cable having a first end and a second end;
   said first end of said at least one control cable being operatively associated with said shift actuator;
   said second end of said at least one control cable being operatively associated with said device to shift gearing;

said shift actuator comprising:
   an interior portion and an exterior portion;
   a first part being rotatable in a first direction and a second direction;
   said first part being operatively connected to said device to shift gearing;
   said first part comprising a rotatable grip part, said rotatable grip part having an axis of rotation;
   a second part, said second part comprising a device to actuate said first end of said at least one control cable;
   a device to connect said first part and said second part to one another and to rotate said first part and said second part along with one another;
   a housing, said housing defining at least a portion of said interior portion of said shift actuator;
   at least a portion of said second part being disposed within said housing;
   a device to seal said interior portion of said shift actuator, said device to seal being disposed between said housing and said first part;
   said device to seal comprising:
      a groove, said groove being circular and extending about the axis of rotation;
      a tongue, said tongue being circular and extending about the axis of rotation; and said tongue being disposed to extend a substantial distance into said groove;

said groove having a depth defined along the axis of rotation;

said tongue having a length defined along the axis of rotation, said length of said tongue extending a substantial distance into said depth of said groove;

said first part comprising said groove and said housing comprising said tongue;

said tongue extending into said groove with a clearance to form a frictionless seal between said first part and said housing;

said tongue comprising a first side and a second side extending substantially along the axis of rotation and a third side adjoining said first side and said second side;

said groove comprising a first side and a second side extending substantially along the axis of rotation and a third side adjoining said first side of said groove and said second side of said groove;

said first side of said tongue and said first side of said groove being disposed adjacent one another and defining a clearance therebetween;

said second side of said tongue and said second side of said groove being disposed adjacent one another and defining a clearance therebetween;

said third side of said tongue and said third side of said groove being disposed adjacent one another and defining a clearance therebetween;

said housing comprising a first tubular extension disposed about said handlebar and immediately adjacent said handlebar;

said first part and said second part both being rotatable with respect to said first tubular extension and said housing;

said second part comprising a cable-winding mechanism, said cable-winding mechanism comprising:
  a second tubular extension rotatably disposed about said first tubular extension, said second tubular extension having a first end disposed adjacent said first part and a second end disposed a substantial distance from said first end of said second tubular extension;
  a disc-shaped member extending from said second end of said second tubular extension and extending generally radially with respect to the axis of rotation;
  said disc-shaped member comprising said device to actuate said first end of said at least one control cable, said device to actuate comprising a guide member disposed on said disc-shaped member for guiding said at least one control cable along a portion of said disc-shaped member;
  said device to connect comprising a plurality of claws disposed circumferentially about said first end of said second tubular extension, said plurality of claws extending generally radially with respect to the axis of rotation;
  one of said plurality of claws having a different configuration than the other ones of said plurality of claws;

said first part comprising:
  a substantially cylindrical part and a frusto-conical part disposed immediately adjacent one another and being integral with one another;
  said cylindrical part having a hole disposed therethrough, said hole being disposed substantially concentrically about the axis of rotation, a portion of said handlebar being disposed immediately adjacent and within said hole;
  said device to connect further comprising a plurality of recesses disposed in said frusto-conical part and extending in a direction generally radially with respect to the axis of rotation;
  one of said plurality of recesses having a different configuration than the other ones of said plurality of recesses, said different one of said plurality of recesses being adapted to receive said different one of said plurality of claws;
  said different one of said claws being engaged with said different one of said recesses, the remaining ones of said plurality of claws being engaged in corresponding ones of said plurality of recesses; and
  said frusto-conical part comprising said groove.

2. A bicycle, said bicycle comprising:

a frame;

at least two wheels, said at least two wheels comprising at least a front wheel and a rear wheel;

said at least two wheels being disposed on said frame;

a device to propel at least one of said front wheel and said rear wheel;

said device to propel comprising:
  a chain;
  at least two sprockets to engage said chain;

at least two pedals, said at least two pedals being connected to one of said at least two sprockets;

a seat, said seat being disposed on said frame;

a handlebar for steering said bicycle;

a bicycle gearing system, said bicycle gearing system comprising:
  a device to shift gearing associated with at least one of: said front wheel and said rear wheel of said bicycle;
  a shift actuator mounted on said handlebar, generally coaxially with said handlebar;
  at least one control cable having a first end and a second end;
  said first end of said at least one control cable being operatively associated with said shift actuator;
  said second end of said at least one control cable being operatively associated with said device to shift gearing;
  said shift actuator comprising:
    an interior portion and an exterior portion;
    a first part being rotatable in a first direction and a second direction;
    said first part being operatively connected to said device to shift gearing;
    said first part comprising a rotatable grip part, said rotatable grip part having an axis of rotation;
    a second part, said second part comprising a device to actuate said first end of said at least one control cable;
    a device to connect said first part and said second part to one another and to rotate said first part and said second part along with one another;
    a housing, said housing defining at least a portion of said interior portion of said shift actuator;
    at least a portion of said second part being disposed within said housing;
    a device to seal said interior portion of said shift actuator, said device to seal being disposed between said housing and said first part;

said device to seal comprising:
  a groove, said groove being circular and extending about the axis of rotation;
  a tongue, said tongue being circular and extending about the axis of rotation; and
  said tongue being disposed to extend a substantial distance into said groove;
  said groove having a depth defined along the axis of rotation;
  said tongue having a length defined along the axis of rotation, said length of said tongue extending a substantial distance into said depth of said groove;

said first part comprising said groove and said housing comprising said tongue;

said tongue contacting a portion of said first part to form a friction seal between said housing and said first part;

said friction seal comprising a lip seal;

said housing comprising a first tubular extension disposed about said handlebar and immediately adjacent said handlebar;

said first part and said second part both being rotatable with respect to said first tubular extension and said housing;

said second part comprising a cable-winding mechanism, said cable-winding mechanism comprising:
  a second tubular extension rotatably disposed about said first tubular extension, said second tubular extension having a first end disposed adjacent said first part and a second end disposed a substantial distance from said first end of said second tubular extension;
  a disc-shaped member extending from said second end of said second tubular extension and extending generally radially with respect to the axis of rotation;
  said disc-shaped member comprising said device to actuate said first end of said at least one control cable, said device to actuate comprising a guide member disposed on said disc-shaped member for guiding said at least one control cable along a portion of said disc-shaped member;
  said device to connect comprising a plurality of claws disposed circumferentially about said first end of said second tubular extension, said plurality of claws extending generally radially with respect to the axis of rotation;
  one of said plurality of claws having a different configuration than the other ones of said plurality of claws;

said first part comprising:
  a substantially cylindrical part and a frusto-conical part disposed immediately adjacent one another and being integral with one another;
  said frusto-conical part having an end portion disposed immediately adjacent said housing, said end portion comprising said groove;
  said end portion of said frusto-conical part having a circumference encircling the axis of rotation;
  said cylindrical part having a hole disposed therethrough, said hole being disposed substantially concentrically about the axis of rotation, a portion of said handlebar being disposed immediately adjacent and within said hole;
  said device to connect further comprising a plurality of recesses disposed in said frusto-conical part and extending in a direction generally radially with respect to the axis of rotation;
  one of said plurality of recesses having a different configuration than the other ones of said plurality of recesses, said different one of said plurality of recesses having a configuration adapted to receive said different one of said plurality of claws;
  said different one of said claws being engaged with said different one of said recesses, the remaining ones of said plurality of claws being engaged in corresponding ones of said plurality of recesses;

said first part comprising an inner portion and an outer portion, said inner portion being disposed within said outer portion and being non-rotatably attached to said outer portion;

said outer portion of said first part comprising said portion of said first part contacting said tongue;

said portion of said first part contacting said tongue extending generally in a radial direction with respect to the axis of rotation and extending over a portion of said groove a sufficient amount such that said portion of said first part contacts said tongue to form said friction seal; and said portion of said first part contacting said tongue extending the entire extent of said circumference of said end portion of said frusto-conical part to seal said interior portion of said shift actuator.

3. A handlebar mountable bicycle gear shifter, said gear shifter comprising:
  a shift actuator mounted on a handlebar, generally coaxially with the handlebar;
  at least one control cable having a first end and a second end;
  said first end of said at least one control cable being operatively associated with said shift actuator;
  said second end of said at least one control cable for being operatively associated with gearing;
  said shift actuator comprising:
    an interior portion and an exterior portion;
    a first part being rotatable in a first direction and a second direction;
    said first part for being operatively connected to gearing;
    said first part comprising a rotatable grip part, said rotatable grip part having an axis of rotation;
    a second part, said second part comprising a device to actuate said first end of said at least one control cable;
    a device to connect said first part and said second part to one another and to rotate said first part and said second part along with one another;
    a housing, said housing defining at least a portion of said interior portion of said shift actuator;
    at least a portion of said second part being disposed within said housing;
    a device to seal said interior portion of said shift actuator, said device to seal being disposed between said housing and said first part;
    said device to seal comprising:
      a groove, said groove being circular and extending about the axis of rotation;
      a tongue, said tongue being circular and extending about the axis of rotation; and
      said tongue being disposed to extend a substantial distance into said groove;
  said first part comprising said groove and said housing comprising said tongue;

said groove having a depth defined along the axis of rotation;

said tongue having a length defined along the axis of rotation, said length of said tongue extending a substantial distance into said depth of said groove;

said tongue extending into said groove with a clearance to form a frictionless seal between said first part and said housing;

said tongue comprising a first side and a second side extending substantially along the axis of rotation and a third side adjoining said first side and said second side;

said groove comprising a first side and a second side extending substantially along the axis of rotation and a third side adjoining said first side of said groove and said second side of said groove;

said first side of said tongue and said first side of said groove being disposed adjacent one another and defining a clearance therebetween;

said second side of said tongue and said second side of said groove being disposed adjacent one another and defining a clearance therebetween;

said third side of said tongue and said third side of said groove being disposed adjacent one another and defining a clearance therebetween;

said housing comprising a first tubular extension for being disposed about a handlebar and for being disposed immediately adjacent a handlebar;

said first part and said second part both being rotatable with respect to said first tubular extension and said housing;

said second part comprising a cable-winding mechanism, said cable-winding mechanism comprising:

a second tubular extension rotatably disposed about said first tubular extension, said second tubular extension having a first end disposed adjacent said first part and a second end disposed a substantial distance from said first end of said second tubular extension;

a disc-shaped member extending from said second end of said second tubular extension and extending generally radially with respect to the axis of rotation;

said disc-shaped member comprising said device to actuate said first end of said at least one control cable, said device to actuate comprising a guide member disposed on said disc-shaped member for guiding said at at least one control cable along a portion of said disc-shaped member;

said device to connect comprising a plurality of claws disposed circumferentially about said first end of said second tubular extension, said plurality of claws extending generally radially with respect to the axis of rotation;

one of said plurality of claws having a different configuration than the other ones of said plurality of claws;

said first part comprising:

a substantially cylindrical part and a frusto-conical part disposed immediately adjacent one another and being integral with one another;

said cylindrical part having a hole disposed therethrough, said hole being disposed substantially concentrically about the axis of rotation;

said device to connect further comprising a plurality of recesses disposed in said frusto-conical part and extending in a direction generally radially with respect to the axis of rotation;

one of said plurality of recesses having a different configuration than the other ones of said plurality of recesses, said different one of said plurality of recesses being adapted to receive said different one of said plurality of claws;

said different one of said claws being engaged with said different one of said recesses, the remaining ones of said plurality of claws being engaged in corresponding ones of said plurality of recesses; and said frusto-conical part comprising said groove.

4. A handlebar mountable bicycle gear shifter, said gear shifter comprising:

a shift actuator mounted on a handlebar, generally coaxially with the handlebar;

at least one control cable having a first end and a second end;

said first end of said at least one control cable being operatively associated with said shift actuator;

said second end of said at least one control cable for being operatively associated with gearing;

said shift actuator comprising:

an interior portion and an exterior portion;

a first part being rotatable in a first direction and a second direction;

said first part for being operatively connected to gearing;

said first part comprising a rotatable grip part, said rotatable grip part having an axis of rotation;

a second part, said second part comprising a device to actuate said first end of said at least one control cable;

a device to connect said first part and said second part to one another and to rotate said first part and said second part along with one another;

a housing, said housing defining at least a portion of said interior portion of said shift actuator;

at least a portion of said second part being disposed within said housing;

a device to seal said interior portion of said shift actuator, said device to seal being disposed between said housing and said first part;

said device to seal comprising:

a groove, said groove being circular and extending about the axis of rotation;

a tongue, said tongue being circular and extending about the axis of rotation; and said tongue being disposed to extend a substantial distance into said groove;

said first part comprising said groove and said housing comprising said tongue;

said groove having a depth defined along the axis of rotation;

said tongue having a length defined along the axis of rotation, said length of said tongue extending a substantial distance into said depth of said groove;

said tongue contacting a portion of said first part to form a friction seal between said housing and said first part;

said friction seal comprising a lip seal;

said housing comprising a first tubular extension for being disposed about a handlebar and for being disposed immediately adjacent a handlebar;

said first part and said second part both being rotatable with respect to said first tubular extension and said housing;

said second part comprising a cable-winding mechanism, said cable-winding mechanism comprising:

a second tubular extension rotatably disposed about said first tubular extension, said second tubular extension having a first end disposed adjacent said first part and a second end disposed a substantial distance from said first end of said second tubular extension;

a disc-shaped member extending from said second end of said second tubular extension and extending generally radially with respect to the axis of rotation;

said disc-shaped member comprising said device to actuate said first end of said at least one control cable, said device to actuate comprising a guide member disposed on said disc-shaped member for guiding said at least one control cable along a portion of said disc-shaped member;

said device to connect comprising a plurality of claws disposed circumferentially about said first end of said second tubular extension, said plurality of claws extending generally radially with respect to the axis of rotation;

one of said plurality of claws having a different configuration than the other ones of said plurality of claws;

said first part comprising:

a substantially cylindrical part and a frusto-conical part disposed immediately adjacent one another and being integral with one another;

said frusto-conical part having an end portion disposed immediately adjacent said housing and comprising said groove;

said end portion of said frusto-conical part having a circumference extending about the axis of rotation;

said cylindrical part having a hole disposed therethrough, said hole being disposed substantially concentrically about the axis of rotation;

said device to connect further comprising a plurality of recesses disposed in said frusto-conical part and extending in a direction generally radially with respect to the axis of rotation;

one of said plurality of recesses having a different configuration than the other ones of said plurality of recesses, said different one of said plurality of recesses having a configuration adapted to receive said different one of said plurality of claws;

said different one of said claws being engaged with said different one of said recesses, the remaining ones of said plurality of claws being engaged in corresponding ones of said plurality of recesses;

said frusto-conical part comprising said groove;

said first part comprising an inner portion and an outer portion, said inner portion being disposed within said outer portion and being non-rotatably attached to said outer portion;

said outer portion of said first part comprising said portion of said first part contacting said tongue;

said portion of said first part contacting said tongue extending generally in a radial direction with respect to the axis of rotation and extending over a portion of said groove a sufficient amount such that said portion of said first part contacts said tongue to form said friction seal; and said portion of said first part contacting said tongue extending the entire extent of said circumference of said end portion of said frusto-conical part to seal said interior portion of said shift actuator.

* * * * *